United States Patent
Kimura et al.

(10) Patent No.: US 7,908,553 B2
(45) Date of Patent: Mar. 15, 2011

(54) INFORMATION PROCESSING APPARATUS, INFORMATION PROCESSING METHOD, RECORDING MEDIUM, AND PROGRAM

(75) Inventors: Tetsuya Kimura, Tokyo (JP); Hidenobu Takemura, Kanagawa (JP); Yasuyuki Nagata, Kanagawa (JP)

(73) Assignee: Sony Corporation, Tokyo (JP)

( * ) Notice: Subject to any disclaimer, the term of this patent is extended or adjusted under 35 U.S.C. 154(b) by 1036 days.

(21) Appl. No.: 10/210,524

(22) Filed: Aug. 1, 2002

(65) Prior Publication Data

US 2003/0043128 A1  Mar. 6, 2003

(30) Foreign Application Priority Data

Aug. 3, 2001 (JP) ................ 2001-236307

(51) Int. Cl.
G06F 3/00 (2006.01)
G06F 3/048 (2006.01)
(52) U.S. Cl. ...................... 715/703; 715/780
(58) Field of Classification Search .......... 715/780, 715/703
See application file for complete search history.

(56) References Cited

U.S. PATENT DOCUMENTS

| | | | |
|---|---|---|---|
| 5,329,609 A * | 7/1994 | Sanada et al. | 704/251 |
| 5,594,640 A * | 1/1997 | Capps et al. | 715/235 |
| 5,634,066 A | 5/1997 | Takehara et al. | |
| 5,959,629 A | 9/1999 | Masui | |
| 6,002,390 A * | 12/1999 | Masui | 345/173 |
| 6,016,142 A | 1/2000 | Shun-Hwa et al. | |
| 6,286,064 B1 * | 9/2001 | King et al. | 710/67 |
| 6,307,548 B1 * | 10/2001 | Flinchem et al. | 715/811 |
| 6,616,703 B1 * | 9/2003 | Nakagawa | 715/201 |

FOREIGN PATENT DOCUMENTS

EP  1 022 649  7/2000

OTHER PUBLICATIONS

Panasonic; "Press CES 2000 Press Release: Panasonic Expands Digital Palmcorder Camcorder / Digital Still Camera Line, Offering Consumers Basic to Advanced Models", Jan. 2000, p. 1-3.*

* cited by examiner

*Primary Examiner* — William L Bashore
*Assistant Examiner* — David Phantana-angkool
(74) *Attorney, Agent, or Firm* — Frommer Lawrence & Haug LLP; William S. Frommer; Thomas F. Presson

(57) ABSTRACT

An input assistance button that is repeatedly operated in a state in which characters are displayed in a character input area. The characters serve as input assistance to words, as they are repeatedly displayed in the character input area in a predetermined order. The characters comprise of alphabetical letters in English and special characters other than the alphabetical letters in English.

9 Claims, 27 Drawing Sheets

FIG. 11

PPP LOG-IN:
　□□□@△△△

PPP PASSWORD:
　○×△□#&★φ

TELEPHONE NUMBER OF ACCESS POINT:
　**-$$$$-¥¥¥¥

POP ID:
　□□□

POP PASSWORD:
　○×△□#&★φ

E-MAIL ADDRESS:
　□□□@△△△△.xxxx.ne.jp

POP SERVER:
　pop.△△△△.xxxx.ne.jp

SMTP MAIL SERVER:
　mail.△△△△.xxxx.ne.jp

NEWS SERVER:
　news01.xxxxx.ne.jp

FIG. 12

DI CUSTOMER ID:
　**000000

DI PASSWORD:
　######

TELEPHONE NUMBER OF ACCESS POINT:
　**-$$$$-¥¥¥¥

FIG. 13A

| GENERAL-ISP SETTING ITEMS |
|---|
| · PPP CONNECTION ID |
| · PPP CONNECTION PASSWORD |
| · TELEPHONE NUMBER OF ACCESS POINT |
| · PRIMARY DNS SERVER |
| · SECONDARY DNS SERVER |
| · PROXY SERVER |
| · PORT NUMBER |
| · POP AUTHENTICATION ID |
| · POP AUTHENTICATION PASSWORD |
| · POP SERVER |
| · SMTP SERVER |
| · MAIL ADDRESS |

FIG. 13B

| EASY-CONNECTION SETTING ITEMS |
|---|
| · UNIFIED ID |
| · PASSWORD |
| · TELEPHONE NUMBER OF ACCESS POINT |

INPUT ASSISTANCE
WORD www.　.html
　.com
　.co
　.ne
　.jp

SYMBOL

!"#$%&'()*
+,-./:;<=>?@
[]^_'{|}~
¥

| TAB 1 | TAB 2 | TAB 3 |
|---|---|---|
| HIRAGANA<br>KATAKANA<br>SYMBOLS (JAPANESE) | ALPHABET<br>INPUT ASSISTANCE WORDS | NUMERALS<br>SYMBOLS |

FIG. 31A

INPUT ASSISTANCE WORDS

À Á Â Ä(Ã)à á â ä ã
(È)É Ê(Ë)è é ê ë
(Ì) Í Î (Ï)ì í î (ï)
Ò Ó (Ô)Ö (Õ) ò ó ô ö (õ)
(Ù) Ú (Û) Ü ù ú (û) ü
(Ỳ) (ý) (ÿ)
N n Ç ç ß (GERMAN)

FIG. 31B

INPUT ASSISTANCE WORDS www.  .html
.com  .net

FIG. 31C

SYMBOLS

|    | 00 | 01 | 02 | 03 | 04 | 05 | 06 | 07 | 08 | 09 | 0A | 0B | 0C | 0D | 0E | 0F |
|----|----|----|----|----|----|----|----|----|----|----|----|----|----|----|----|----|
| 00 |    |    |    |    |    |    |    |    |    |    |    |    |    |    |    |    |
| 10 |    |    |    |    |    |    |    |    |    |    |    |    |    |    |    |    |
| 20 |    | !  | "  | #  | $  | %  | &  | '  | (  | )  | *  | +  | ,  | -  | .  | /  |
| 30 | 0  | 1  | 2  | 3  | 4  | 5  | 6  | 7  | 8  | 9  | :  | ;  | <  | =  | >  | ?  |
| 40 | @  | A  | B  | C  | D  | E  | F  | G  | H  | I  | J  | K  | L  | M  | N  | O  |
| 50 | P  | Q  | R  | S  | T  | U  | V  | W  | X  | Y  | Z  | [  | \  | ]  | ^  | _  |
| 60 | `  | a  | b  | c  | d  | e  | f  | g  | h  | i  | j  | k  | l  | m  | n  | o  |
| 70 | p  | q  | r  | s  | t  | u  | v  | w  | x  | y  | z  | {  | \| | }  | ~  |    |
| 80 |    |    |    |    |    |    |    |    |    |    |    |    |    |    |    |    |
| 90 |    |    |    |    | fl |    |    |    |    |    |    |    |    |    |    |    |
| A0 |    | ¡  | ¢  | £  | ¤  | ¥  | ¦  | §  | ¨  | ©  | ª  | «  | ¬  |  | ®  | ¯  |
| B0 | °  | ±  | ²  | ³  | ´  | µ  | ¶  | ·  | ¸  | ¹  | º  | »  | ¼  | ½  | ¾  | ¿  |
| C0 | À  | Á  | Â  | Ã  | Ä  | Å  | Æ  | Ç  | È  | É  | Ê  | Ë  | Ì  | Í  | Î  | Ï  |
| D0 | Ð  | Ñ  | Ò  | Ó  | Ô  | Õ  | Ö  | ×  | Ø  | Ù  | Ú  | Û  | Ü  | Ý  | Þ  | ß  |
| E0 | à  | á  | â  | ã  | ä  | å  | æ  | ç  | è  | é  | ê  | ë  | ì  | í  | î  | ï  |
| F0 | ð  | ñ  | ò  | ó  | ô  | õ  | ö  | ÷  | ø  | ù  | ú  | û  | ü  | ý  | þ  | ÿ  |

FIG. 33

| TAB 11 | TAB 12 |
|---|---|
| ALPHABET<br>SPECIAL CHARACATERS<br>INPUT ASSISTANCE WORDS | NUMERALS<br>SYMBOLS |

.net (B)

INFORMATION PROCESSING APPARATUS, INFORMATION PROCESSING METHOD, RECORDING MEDIUM, AND PROGRAM

BACKGROUND OF THE INVENTION

1. Field of the Invention

The present invention relates to information processing apparatuses, information processing methods, recording media, and programs, and more particularly, to an information processing apparatus, an information processing method, a recording medium, and a program which allow special characters to be input with an easy operation.

2. Description of the Related Art

Compact communication apparatuses have been developed which allow communications with servers through networks.

In such a compact communication apparatus, data (such as an address on the Internet) is input, for example, by operating an operation screen displayed on a display section.

Special characters, such as umlauts, other than the alphabetical letters, however, need to be input by inputting the number corresponding to each character, determined in a rule, such as a Japanese Industrial Standard (JIS).

In other words, in conventional compact communication apparatuses, an operation for inputting such special characters is troublesome.

SUMMARY OF THE INVENTION

The present invention has been made in consideration of the above situation. An object of the present invention is to allow special characters to be input with an easy operation.

The foregoing object is achieved in one aspect of the present invention through the provision of an information processing apparatus for processing information input according to an operation content on an operation screen, including a first input section operated to input first information; first display control means for displaying information selected by the first input section on a display section; a second input section operated to input second information; and second display means repeatedly operated in a state in which the first information is being displayed on the display section, to display a plurality of pieces of second information related to the first information in a predetermined order on the display section.

The foregoing object is achieved in another aspect of the present invention through the provision of an information processing method for an information processing apparatus for processing information input according to an operation content on an operation screen, including a first display control step of displaying first information input by operating a first input section, and a second display control step of repeatedly operating a second input section in a state in which the first information is being displayed, to display a plurality of pieces of second information related to the first information in a predetermined order.

The foregoing object is achieved in yet another aspect of the present invention through the provision of a recording medium storing a computer-readable program for an information processing apparatus for processing information input according to an operation content on an operation screen, the program including a first display control step of displaying first information input by operating a first input section, and a second display control step of repeatedly operating a second input section in a state in which the first information is being displayed, to display a plurality of pieces of second information related to the first information in a predetermined order.

The foregoing object is achieved in still another aspect of the present invention through the provision of a program for an information processing apparatus for processing information input according to an operation content on an operation screen, the program making a computer execute a first display control step of displaying first information input by operating a first input section and a second display control step of repeatedly operating a second input section in a state in which the first information is being displayed, to display a plurality of pieces of second information related to the first information in a predetermined order.

According to an information processing apparatus, an information processing method, and a program of the present invention, since a first input section operated to input first information is displayed on an operation screen, and a second input section repeatedly operated in a state in which the first information is being displayed on a display section to display a plurality of pieces of second information related to the first information in a predetermined order on the display section is displayed on the operation screen, the second information is easily input.

BRIEF DESCRIPTION OF THE DRAWINGS

FIG. 11 is a view showing an example of Internet-service-provider-A setting information used in step S79 of FIG. 10.

FIG. 12 is a view showing an example of camcorder setting information used in step S80 of FIG. 10.

FIG. 13A and FIG. 13B are views showing setting items required to connect to the Internet.

FIG. 31A, FIG. 31B, and FIG. 31C are views showing information which can be input from the another input assistance screen.

FIG. 32 is a view showing the numbers corresponding to input assistance words.

FIG. 33 is a view showing the types of information which can be input from the another input assistance screen.

FIG. 34 is a view showing information which can be input from the input assistance screen.

FIG. 35 is a view showing information which can be input from the another input assistance screen.

DESCRIPTION OF THE PREFERRED EMBODIMENTS

Figure 1:
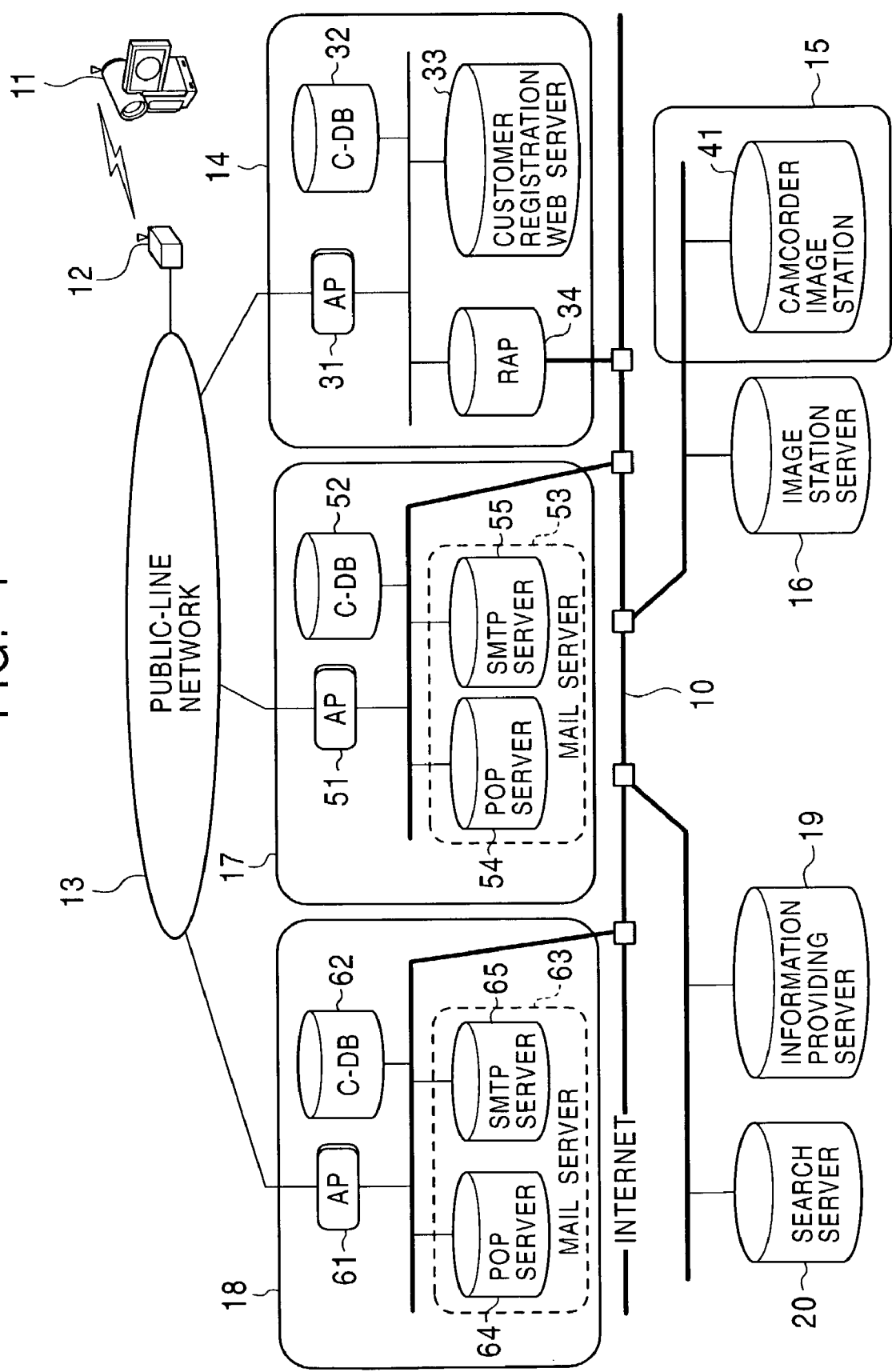
FIG. 1 is a view showing the structure of a service providing system according to an embodiment of the present invention.

FIG. 1 shows an example structure of a service providing system to which the present invention is applied. In this service providing system, a network system 14, a network service business center 15, an image station server 16, an Internet service provider A (ISP-A) 17, an Internet service provider B (ISP-B) 18, an information providing server 19, and a search server 20 are connected to the Internet 10.

The network system 14, the Internet service provider A 17, and the Internet service provider B 18 are also connected to a public-line network 13. The public-line network 13 is further connected to a Bluetooth adapter 12. A camcorder 11 is connected to the Bluetooth adapter 12 via short-distance radio communication by the use of Bluetooth (trademark), and can be connected to the network system 14, the Internet service provider A 17, or the Internet service provider B 18 through the public-line network 13.

The network system 14 is formed of an access point (AP) 31, a customer data base (C-DB) 32, a customer registration web server 33, and a registration authentication platform (RAP) 34.

The access point 31 is connected to the public-line network 13. Various types of information of each user who purchased the camcorder 11 are input to the customer data base 32. The customer registration web server 33 controls registration processing related to the camcorders 11. The registration authentication platform 34 executes user authentication processing in the network system 14.

The access point 31, the customer data base 32, the customer registration web server 33, and the registration authentication platform 34 are separately formed in FIG. 1, but they can be formed integratedly as a unit.

The network service business center 15 has a camcorder image station 41. The camcorder image station 41 stores and manages image data sent from the camcorder 11.

The image station server 16 stores and manages image data sent from a personal computer (not shown).

The Internet service provider A 17 is a specific Internet service provider, and includes an access point 51, a customer data base 52, and a mail server 53. The mail server 53 has a POP server 54 and a simple-mail-transfer-protocol (SMTP) server 55.

The access point 51 performs communication processing with the public-line network 13. The customer data base 52 stores various types of information of the users of the Internet service provider A 17. The POP server 54 mainly manages processing for transmitting and receiving mail to and from the camcorder 11. The SMTP server 55 mainly manages processing for transmitting and receiving mail to and from another SMTP server (in this example, an SMTP server 65 in the Internet service provider B 18).

The Internet service provider B 18 includes an access point 61, a customer data base 62, and a mail server 63 formed of a POP server 64 and a SMTP server 65. The basic structure is the same as that of the Internet service provider A 17.

The information providing server 19 provides, for example, various types of information related to products of a certain company. The search server 20 provides service for searching various types of information made open to the public through the Internet 10.

Figure 2:
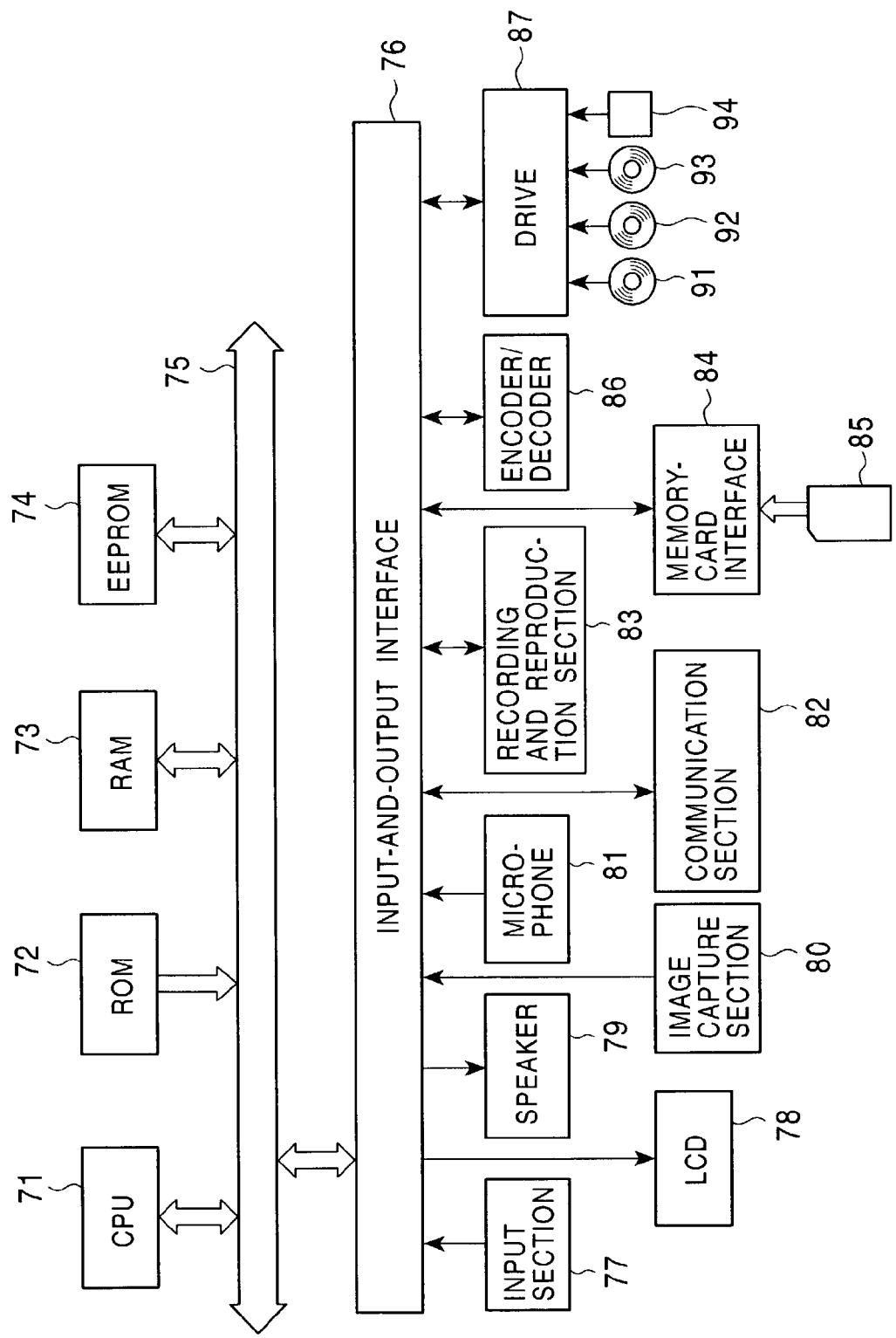
FIG. 2 is a block diagram showing an example structure of a camcorder shown in FIG. 1.

FIG. 2 shows an example structure of the camcorder 11. The camcorder 11 is a videocassette recorder combined with a camera, and has an access function to the Internet 10. In FIG. 2, a central processing unit (CPU) 71 executes various types of processing (such as processing, described after, for displaying an input assistance screen which allows predetermined input assistance words to be easily input, on a liquid-crystal display 78) according to a program stored in a read only memory (ROM) 72 or a program loaded into a random access memory (RAM) 73. The RAM 73 also stores, if necessary, data required when the CPU 71 executes various types of processing. An electrically erasable programmable read only memory (EEPROM) 74 stores data required to be stored even after power off.

The CPU 71, the ROM 72, the RAM 73, and the EEPROM 74 are connected to each other through a bus 75. The bus 75 is also connected to an input-and-output interface 76.

The input-and-output interface 76 is connected to an input section 77 formed of various buttons, switches, and others, the liquid-crystal display (LCD) 78, a speaker 79, an image capture section 80 formed of a charge-coupled device (CCD) and others, a microphone 81 for receiving an audio signal, and a communication section 82 for performing short-distance radio communication with the Bluetooth adapter 12 according to the Bluetooth standard.

A recording and reproduction section 83 records image data captured by the image capture section 80 and audio data collected by the microphone 81, and others into a loaded cassette magnetic tape. The recording and reproduction section 83 also reproduces image data and audio data recorded in a cassette magnetic tape, outputs the image corresponding to the image data to the LCD to display the image, and sends the audio data to the speaker 79 to output the audio data.

When a Memory Stick (trademark) 85, serving as a portable semiconductor memory, is mounted to a memory-card interface 84, the memory-card interface 84 executes data writing processing and data reading processing for the Memory Stick 85. The Memory Stick 85 can store image data captured by the image capture section 80 and audio data collected by the microphone 81, and in addition, various types of data obtained through the communication section 82 via the Internet.

An encoder/decoder 86 encodes or decodes image data by a Moving Picture Experts Group (MPEG) method or a Joint Photographic Coding Experts Group (JPEG) method.

The input-and-output interface 76 is also connected to a drive 78, if necessary. A magnetic disk 91, an optical disk 92, a magneto-optical disk 93, or a semiconductor memory 94 is mounted, as required, to the drive 87, and a computer program read from a mounted medium is installed into the RAM 73, if necessary.

Figure 3:
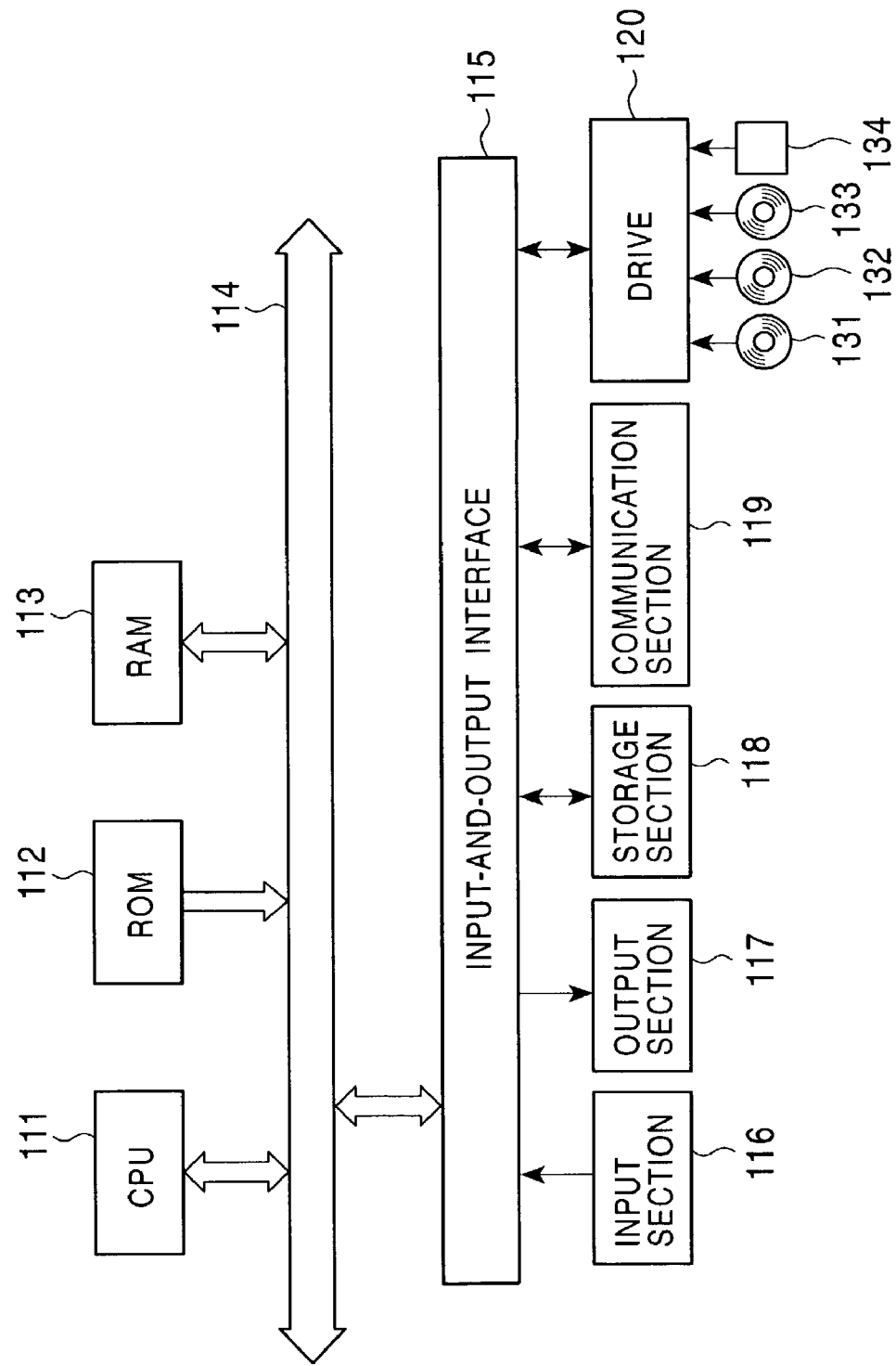
FIG. 3 is a block diagram showing an example structure of a customer registration web server shown in FIG. 1.

FIG. 3 shows an example structure of the customer registration web server 33. In FIG. 3, a CPU 111 executes various types of processing according to a program stored in a ROM 112 or a program loaded from a storage section 118 into a RAM 113. The RAM 113 also stores, if necessary, data required when the CPU 111 executes various types of processing.

The CPU 111, the ROM 112, and the RAM 113 are connected to each other through a bus 114. The bus 114 is also connected to an input-and-output interface 115.

The input-and-output interface 115 is connected to an input section 116 formed of a keyboard, a mouse, and others, the storage section 118 formed of a hard disk and others, and a communication section 119 formed of a modem, a terminal adapter, and others.

The input-and-output interface 115 is also connected to a drive 120, if necessary. A magnetic disk 131, an optical disk 132, a magneto-optical disk 133, or a semiconductor memory 134 is mounted, as required, to the drive 120, and a computer program read from a mounted medium is installed into the storage section 118, if necessary.

When the access point 31, the customer data base 32, and the registration authentication platform 34 are separately formed from the customer registration web server 33, they have basically the same structure as the customer registration web server 33 although they are not shown.

Figure 4:
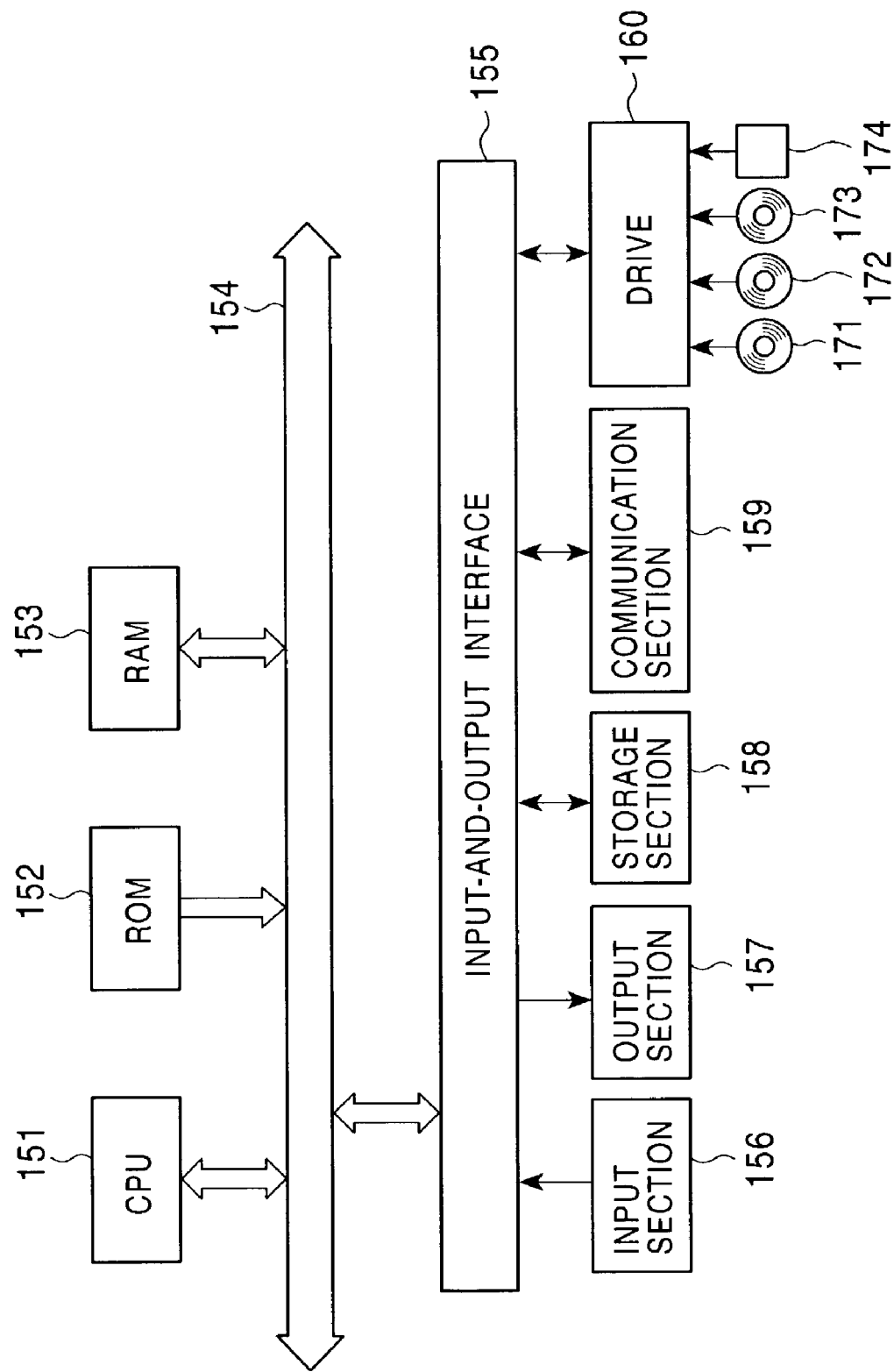
FIG. 4 is a block diagram showing an example structure of a camcorder image station shown in FIG. 1.

FIG. 4 shows an example structure of the camcorder image station 41 constituting the network service business center 15. Units constituting the camcorder image station 41, from a CPU 151 to a semiconductor memory 174, have basically the same structures as the units constituting the customer registration web server 33 shown in FIG. 3, from the CPU 111 to the semiconductor memory 134. Units having the corresponding names have the corresponding functions. Therefore, to avoid repetition of descriptions thereof, they are omitted.

Figure 5:
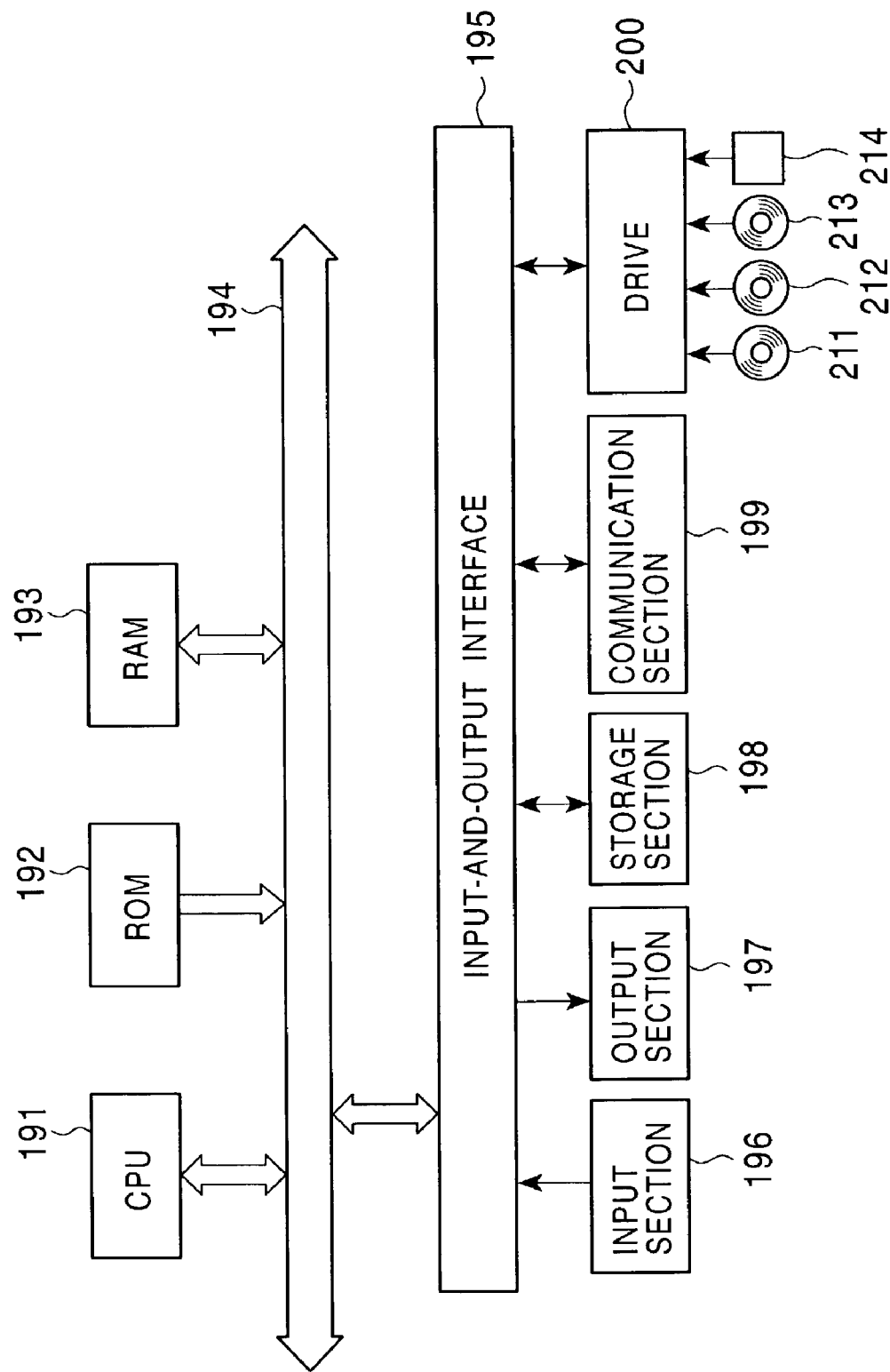
FIG. 5 is a block diagram showing an example structure of a customer data base shown in FIG. 1.

FIG. 5 shows an example structure of the customer data base 52 in the Internet service provider A 17. Units constituting the customer data base 52, from a CPU 191 to a semiconductor memory 214, have basically the same structures as the units constituting the customer registration web server 33 shown in FIG. 3, from the CPU 111 to the semiconductor memory 134. Since units having the corresponding names have the corresponding functions, descriptions thereof are omitted to avoid repetition.

When the access point 51 and the mail server 53 (POP server 54 and SMTP server 55) are formed separately from the customer data base 52, they have basically the same structure as the customer data base 52 shown in FIG. 5.

Each user who purchased the camcorder 11 can use the services provided by the service providing system shown in FIG. 1. To use them, the user of the camcorder 11 executes processing for registering the camcorder 11 (its user) into the network system 14. When the user buys a camcorder 11, a Bluetooth adapter 12 is usually attached to the camcorder 11 (if not, a Bluetooth adapter 12 needs to be purchased). The user can connect the Bluetooth adapter 12 to the public-line network 13 to register the camcorder 11 (its user) to the network system 14.

Figure 6:
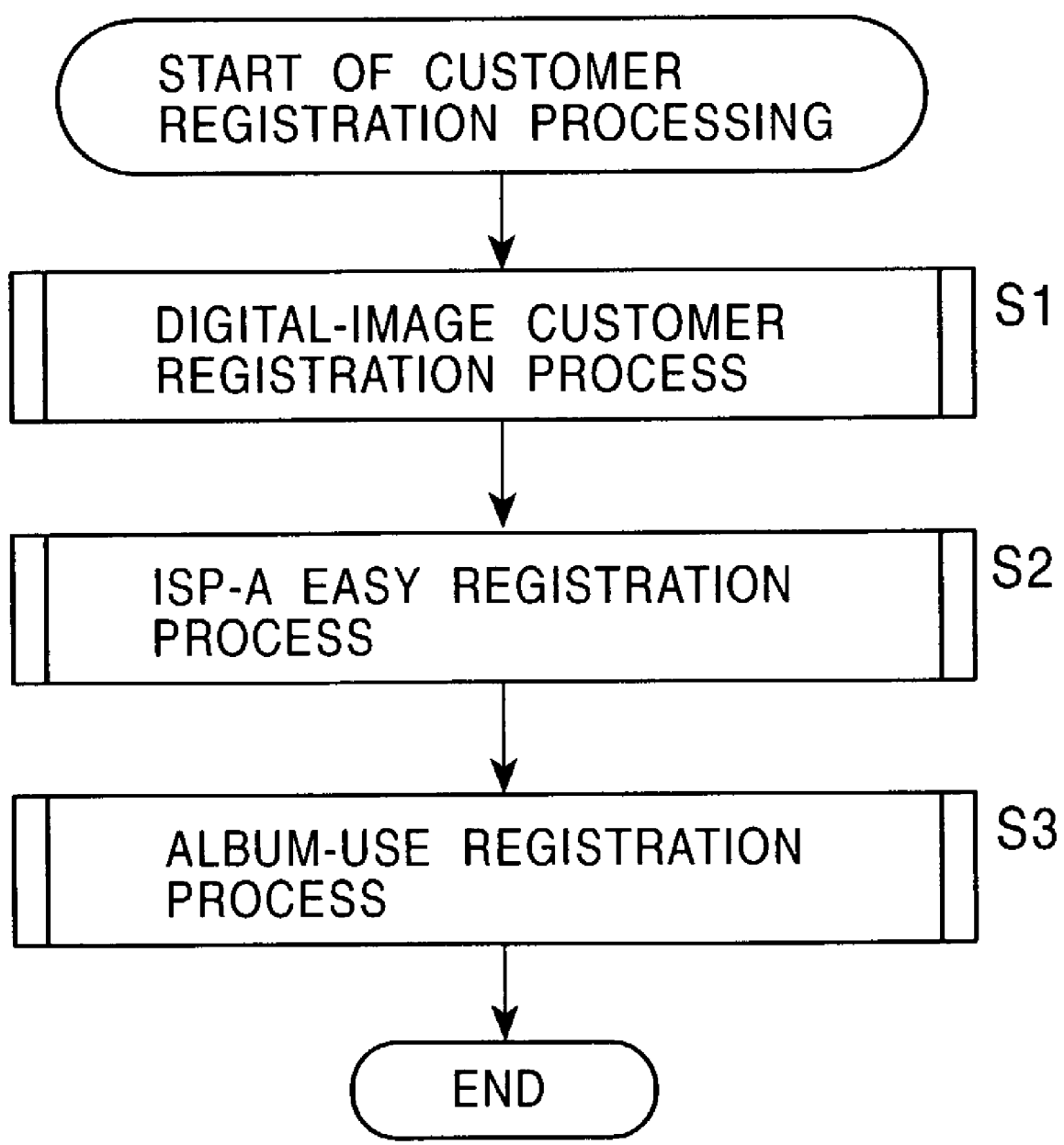
FIG. 6 is a flowchart of customer registration processing in the service providing system shown in FIG. 1.

The registration processing is executed by the service providing system according to a flowchart shown in FIG. 6. Specifically, in step S1, the network system 14 executes a digital-image customer registration process. Then, in step S2, the Internet service provider A 17 executes an Internet-service-provider-A easy registration process. And then, in step S3, the network service business center 15 executes an album-use registration process.

The processes of step S1 to step S3 will be separately described below.

Figure 7:
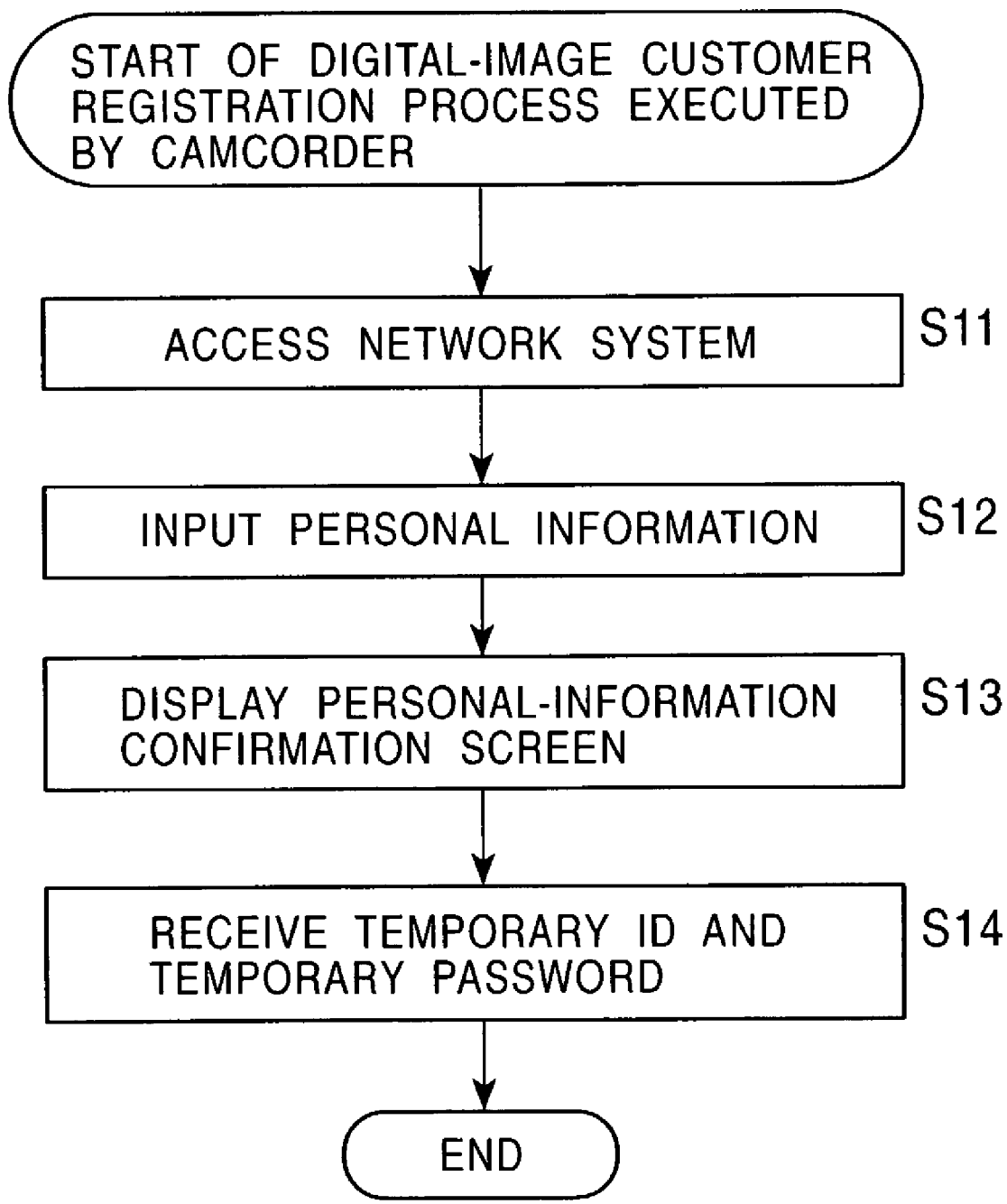
FIG. 7 is a flowchart of a digital-image customer registration process executed by the camcorder shown in FIG. 1.

The digital-image customer registration process executed by the network system 14 will be described first by referring to flowcharts shown in FIG. 7 and FIG. 8. FIG. 7 shows a process executed by the camcorder 11 in the registration process, and FIG. 8 shows a process corresponding thereto, executed by the customer registration web server 33.

In step S11, the user of the camcorder 11 operates the input section 77 to instruct an access to the network system 14. The destination of the access is stored in the ROM 72 in advance. The CPU 71 controls the communication section 82 according to information stored in the ROM 72 to instruct an access to the access point 31 of the network system 14. When the communication section 82 receives this instruction, it performs short-distance radio communication with the Bluetooth adapter 12 and accesses the access point 31 of the network system 14 through the public-line network 13 from the Bluetooth adapter 12.

A guest ID is used in this first access to the network system 14. When the user inputs, for example, "GUEST" as an ID, the registration authentication platform 34 allows an access. When the registration authentication platform 34 allows an access from the camcorder 11, the registration authentication platform 34 passes a management right of processing related to the camcorder 11 to the customer registration web server 33.

Figure 8:
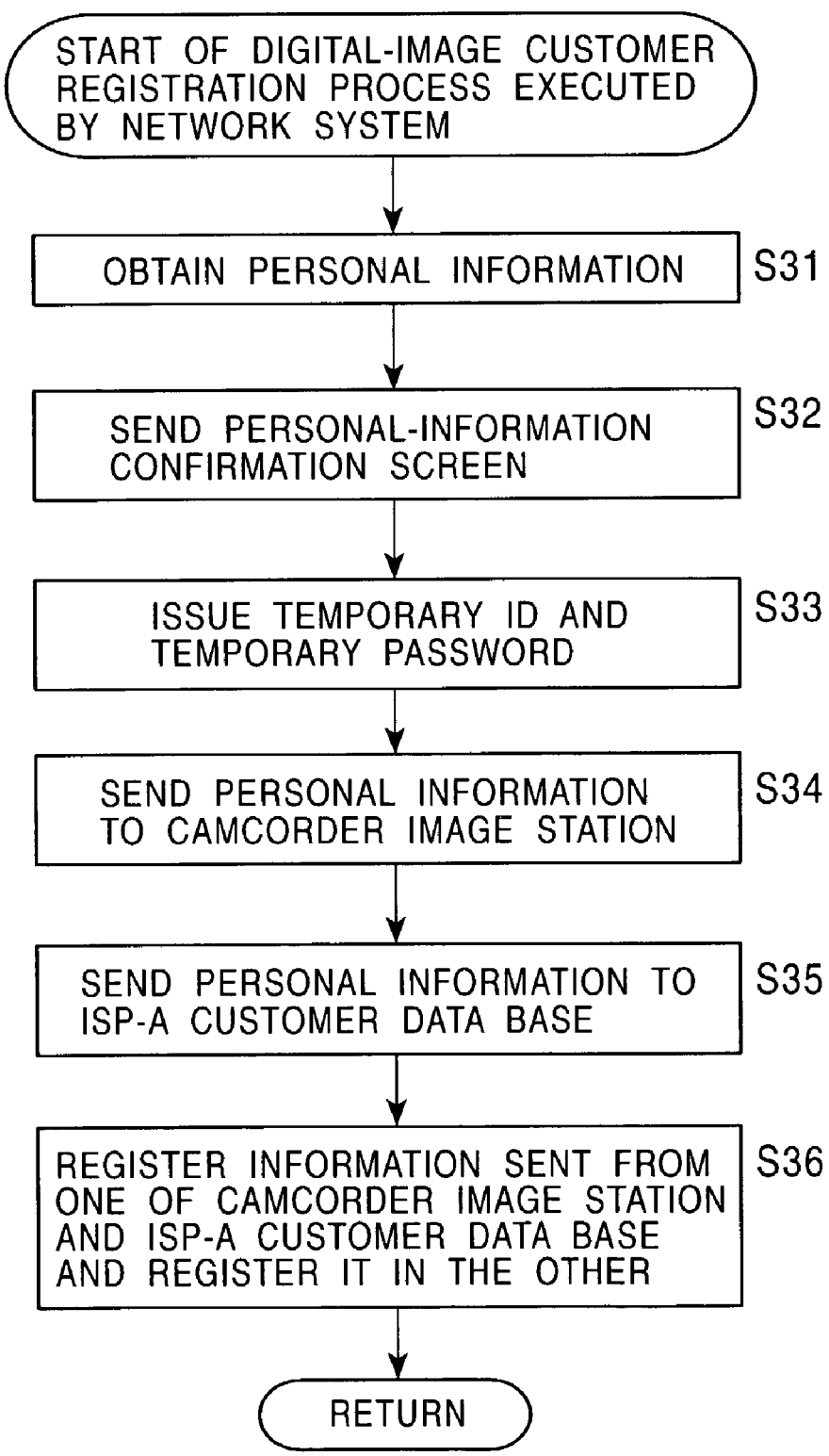
FIG. 8 is a flowchart of a digital-image customer registration process executed by a network system shown in FIG. 1.

The CPU 111 of the customer registration web server 33 requests the user of the camcorder 11 to input personal information in step S31 of FIG. 8. This request is output from the communication section 119, and sent to the camcorder 11 through the access point 31, the public-line network 13, and the Bluetooth adapter 12.

When the CPU 71 of the camcorder 11 receives this request through the communication section 82, the CPU 71 outputs and displays a message corresponding to the request to and on the LCD 78 in step S12.

The user of the camcorder 11 operates the input section 77 to input personal information in response to the message. The personal information includes a registration code (described on a postcard attached to the camcorder 11) formed of 16 figures of numerals and alphabetical letters of the camcorder 11; the zip code, the name, the address, the birth date, the gender, the telephone number, and the electronic-mail address of the user; the manufacturing number (serial number) of the camcorder 11; and a purchase date.

The CPU 71 of the camcorder 11 sends these pieces of personal information input in step S12 to the network system 14.

More specifically, the CPU 71 controls the communication section 82 to send the input personal information to the network system 14. This personal information is sent to the customer registration web server 33 through the Bluetooth adapter 12, the public-line network 13, and the access point 31.

When the CPU 111 of the customer registration web server 33 obtains the personal information through the communication section 119 in step S31 of FIG. 8, the CPU 111 sends the personal information to the RAM 113 and temporarily stores in it.

When the personal information has been registered in the RAM 113, the CPU 111 generates a personal-information confirmation screen in step S32, and sends it to the camcorder 11 through the communication section 119. The data of the personal-information confirmation screen is sent to the Bluetooth adapter 12 through the access point 31 and the public-line network 13, and then is sent from the Bluetooth adapter 12 to the camcorder 11.

When the CPU 71 of the camcorder 11 receives the data of the personal-information confirmation screen through the communication section 82, the CPU 71 temporarily stores it in the RAM 73, then read it again, outputs it to the LCD 78, and displays it thereon in step S13 of FIG. 7. With this operation, the personal information input by the user of the camcorder 11 is displayed for confirmation.

When the user operates the input section 77 to input an indication showing that the user has confirmed the input personal information, the CPU 71 sends a confirmation signal from the communication section 82 to the customer registration web server 33.

When the CPU 111 of the customer registration web server 33 receives this confirmation signal through the communication section 119, the CPU 111 sends the personal information registered in the RAM 113 to the storage section 118, and stores the personal information therein in step S32 of FIG. 8.

Then, in step S33, the CPU 111 issues a temporary ID and a temporary password to the user of the camcorder 11. The temporary ID and the temporary password are output from the communication section 119, and sent to the camcorder 11 through the access point 31, the public-line network 13, and the Bluetooth adapter 12.

When the CPU 71 of the camcorder 11 receives the temporary ID and the temporary password through the communication section 82 in step S14 of FIG. 7, the CPU 71 sends them to the LCD 78 and displays them thereon, or sends them to the EEPROM 74 and stores them therein.

The customer registration web server 33 sends the personal information of the user of the camcorder 11, registered in the storage section 118 to the customer data base 32, as described above, and registers therein in step S33.

In step S34, the customer data base 32 sends the personal information to the camcorder image station 41 of the network service business center 15 through the Internet.

When the CPU 151 of the camcorder image station 41 receives the personal information sent from the network system 14 through the communication section 159, the CPU 151 sends it to the storage section 158 and stores therein (in step S121 of FIG. 15, described later).

In step S35, the customer data base 32 further sends the personal information of the camcorder 11 to the customer data base 52 of the Internet service provider A 17.

The customer data base 52 of the Internet service provider A 17 registers (in step S71 of FIG. 10, described later) the personal information of the camcorder 11, sent from the network system 14 through the Internet 10.

In step S36, since then, when the personal information of the user of the camcorder 11 is changed in the network service business center 15, the customer data base 32 of the network system 14 receives the changed information from the camcorder image station 41 through the Internet 10, and registers it in itself. The customer data base 32 also sends the updated personal information to the customer data base 52 of the Internet service provider A 17, and registers therein.

In contrast, when the user of the camcorder 11 changes the personal information in the Internet service provider A 17, the changed personal information is registered in the customer data base 52. The customer data base 52 sends the changed personal information to the customer data base 32 of the network system 14 through the Internet 10. The customer data base 32 overwrites the old personal information with the input personal information to update the personal information.

At this time, the customer data base 32 further sends the updated personal information to the camcorder image station 41 of the network service business center 15 through the Internet 10.

The camcorder image station 41 updates the old personal information with the use of the input personal information.

As described above, when the personal information is updated in one of the network system 14, the network service business center 15, and the Internet service provider A 17, the personal information is also updated in real time at the other two locations.

As described above, once the user of the camcorder 11 is registered in the customer data base 32 of the network system 14, the network system 14 sends various types of information related to the camcorder 11 to the user of the camcorder 11, as required, through the Internet or by a postcard.

When the digital-image customer registration process has been completed as described above, the ISP-A easy registration process is executed. Specifically, when the customer registration process has been completed, the customer registration web server 33 transfers the management right of processing related to the camcorder 11 to the customer data base 52 of the Internet service provider A 17.

Figure 9:
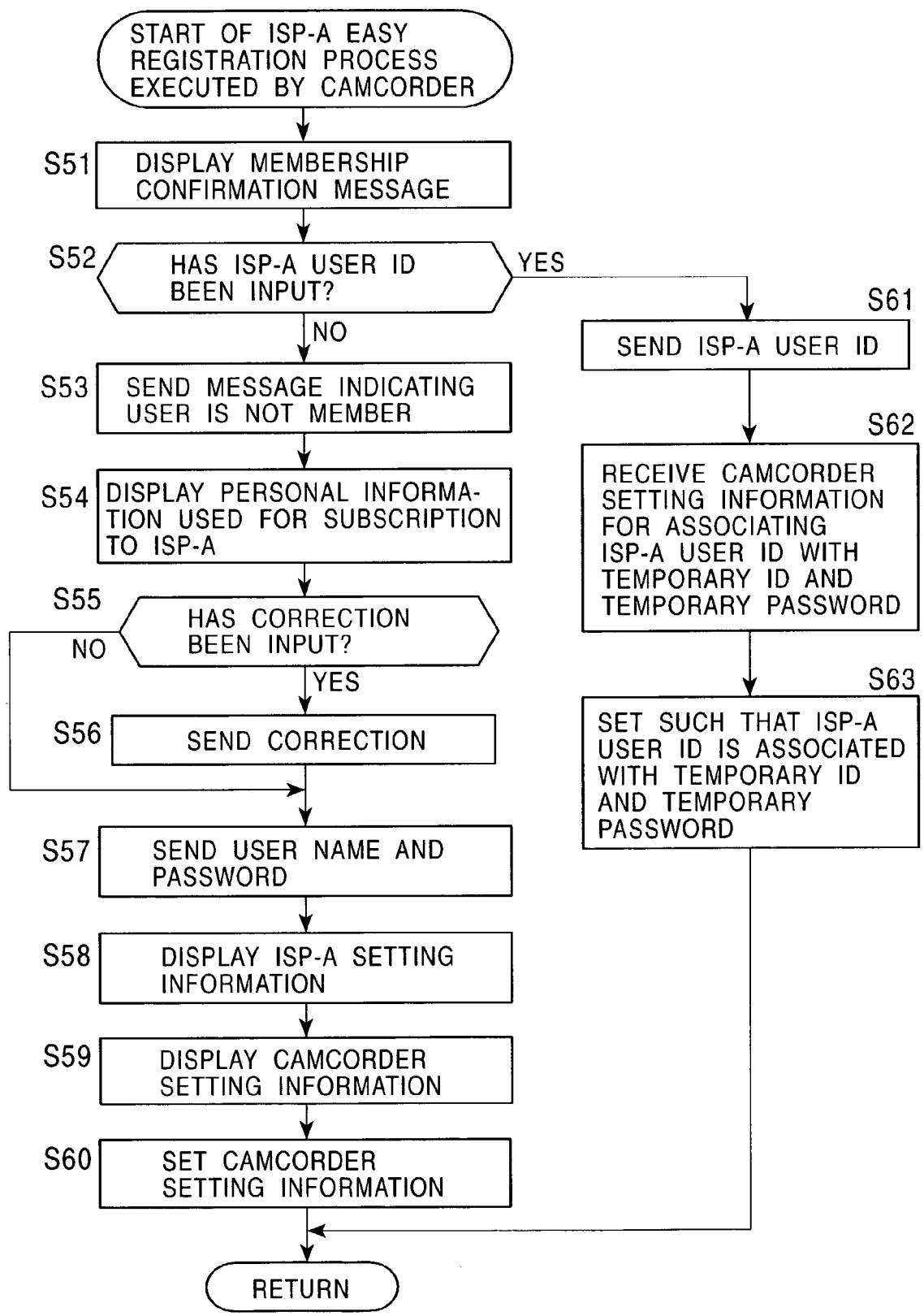
FIG. 9 is a flowchart of an Internet-service-provider-A easy registration process executed by the camcorder shown in FIG. 1.
Figure 10:
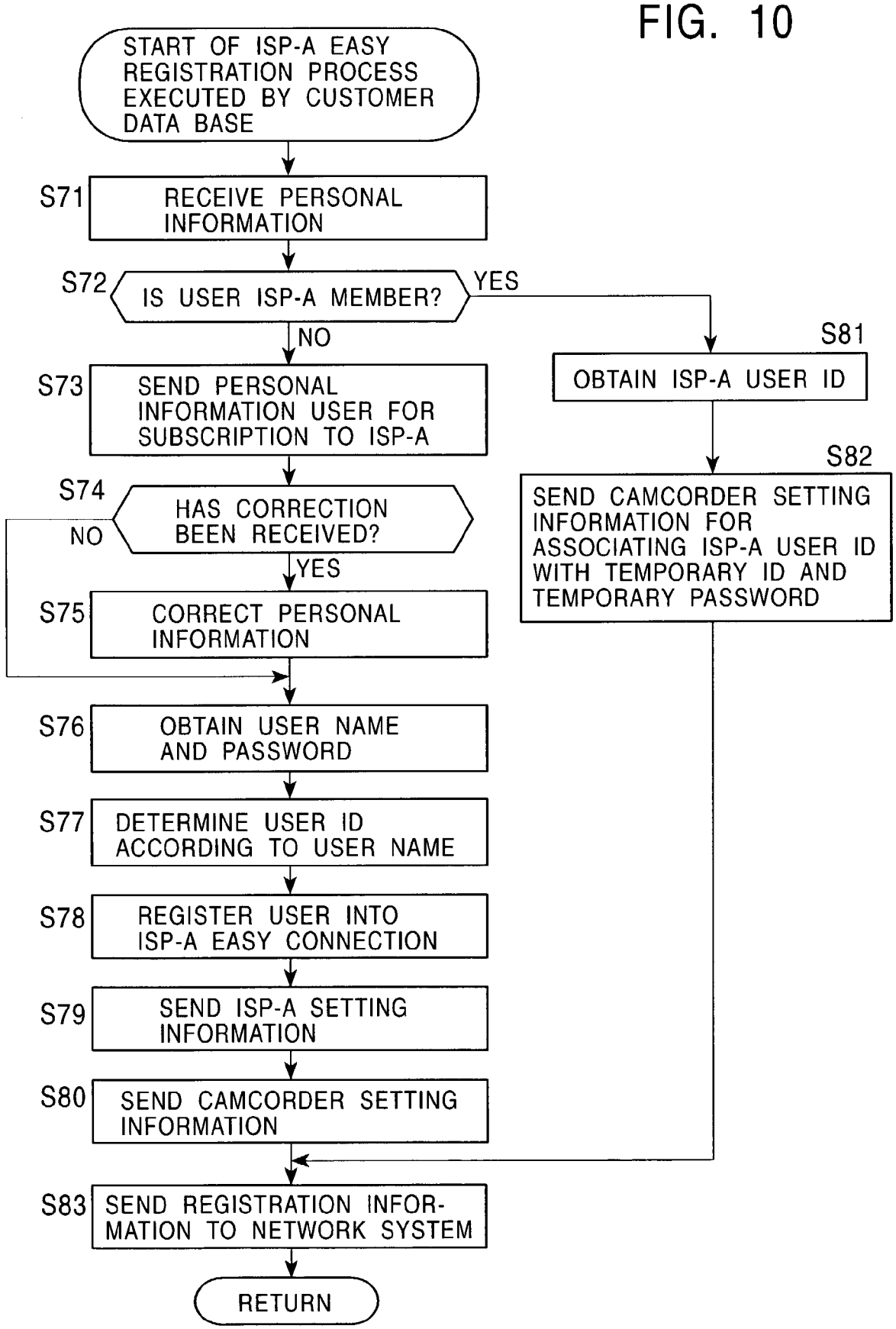
FIG. 10 is a flowchart of an Internet-service-provider-A easy registration process executed by a customer data base in an Internet service provider A shown in FIG. 1.

Therefore, since then, the ISP-A easy registration process is executed between the camcorder 11 and the customer data base 52 of the Internet service provider A 17. FIG. 9 shows a process of the camcorder 11 executed in this case, the FIG. 10 shows a process of the customer data base 52, corresponding thereto.

When the CPU 191 of the customer data base 52 in the Internet service provider A 17 receives the personal information sent from the customer data base 32 of the network system 14 in step S35 of FIG. 8, the CPU 191 sends it to the storage section 198 and stores therein.

When the customer data base 52 of the Internet service provider A 17 receives the personal information related to the camcorder 11 in step S71, the customer data base 52 requests the camcorder 11 to input whether the user has already been a member of the Internet service provider A 17, and when the user is a member, to input the user ID for the Internet service provider A 17.

When the CPU 71 of the camcorder 11 receives this request in S51 of FIG. 9, the CPU 71 outputs the corresponding message to the LCD 78 and displays thereon. Looking at the message, the user operates the input section 77 to input the user ID if the user has already been a member of the Internet service provider A 17, or if the user is not a member, the user inputs a message indicating the state. In step S52, the CPU 71 of the camcorder 11 determines whether the user ID for the Internet service provider A 17 has been input. When a message indicating that the user is not a member is input, the message is sent to the customer data base 52 of the Internet service provider A 17 through the communication section 82 in step S53.

When the CPU 191 of the customer data base 52 receives the message through the communication section 199, the CPU 191 determines that the user is not a member of the Internet service provider A 17 in step S72 of FIG. 10, and the process proceeds to step S73. The CPU 191 sends personal information used for subscribing to the Internet service provider A 17. This personal information is basically the same as the information sent from the network system 14 in the process of step S35 of FIG. 8 and received and stored in step S71.

In step S54 of FIG. 9, when the CPU 71 of the camcorder 11 receives the personal information used for subscribing to the Internet service provider A 17, through the communication section 82, the CPU 71 outputs it to the LCD 78 and displays thereon.

Since this personal information has been input by the user of the camcorder 11 at the user registration to the network system 14, it basically has no error. Just to make sure, the user looks at the indication and determines whether a correction is needed. If a correction is necessary, the user operates the input section 77 to input a correction.

In step S55, the CPU 71 of the camcorder 11 determines whether a correction has been input. When a correction has been input, the CPU 71 sends a corrected item to the customer data base 52 of the Internet service provider A 17 through the communication section 82 in step S56. When a correction has not been input, the process of step S56 is skipped.

The CPU 191 of the customer data base 52 in the Internet service provider A 17 determines in step S74 of FIG. 10 whether a correction has been received through the communication section 199. When a correction has been received, the CPU 199 corrects the personal information which has been already registered, according to the received correction content in step S75. When a correction has not been received, the process of step S75 is skipped.

As the personal information, the personal information which the user who bought the camcorder 11 has input into the network system 14 is displayed basically as is (among the personal information, only information required to subscribed to the Internet service provider A 17 is displayed). Therefore, since it is not necessary for the user in order to subscribe to the Internet service provider A 17 to re-input basically the same items as those input at the user registration to the network system 14, operability is improved.

Next, in step S57, the CPU 71 of the camcorder 11 displays a message prompting to input the user name and the password according to an input guidance sent from the customer data base 52, on the LCD 78. The user of the camcorder 11 operates the input section 77 according to the message to input the user name and the password used by the user to use the Internet service provider 17. The CPU 71 sends the input user name and password to the customer data base 52 of the Internet service provider A 17 through the communication section 82.

In step S76, when the CPU 191 of the customer data base 52 receives the user name and the password through the communication section 199, the CPU 91 determines according to data stored in the storage section 198 whether the user name and the password have already been used by other users. When they have been used, the CPU 191 sends an message indicating the condition to the camcorder 11 from the communication section 199.

When the CPU 71 of the camcorder 11 receives the message through the communication section 82, the CPU 71 displays the message on the LCD 78. When the user reads the message and determines that the input user name and password have been already registered, the user inputs a new user name and a new password.

As described above, when the camcorder sends the user name and the password, the CPU 191 of the customer data base 52 obtains them through the communication section 199 in step S76 of FIG. 10. Then, in step S77, the CPU 191 determines a user ID according to the user name. The user ID is for a member of the Internet service provider A 17.

In the service providing system, a common ID and password can be used for the network system 14, the network service business center 15, and the Internet service provider A 17. As described above, however, at user registration to the network system 14, a temporary ID and a temporary password have been set for the user of the camcorder 11 (in step S14 of FIG. 7 and step S33 of FIG. 8).

In order that the user can use the services in the Internet service provider A 17 with the use of the temporary ID and the temporary password, the CPU 191 generates in step S78 a table describing the relationship in which the temporary ID and the temporary password issued by the network system 14 in step S33 of FIG. 8 and received by the process of step S71 are associated with the user ID determined in step S77, and registers the table in the ISP-A easy connection.

With this operation, when the user accesses the Internet service provider A 17 by using the temporary ID and the temporary password issued by the network system 14 in step S33 shown in FIG. 8 and received by the camcorder 11 in step S14 of FIG. 7, the customer data base 52 searches the table for the user ID corresponding to the temporary ID and the temporary password to allow the user of the camcorder 11 to use the service provided by the Internet service provider A 17.

When the registration of the user of the camcorder 11 as a member of the Internet service provider A 17 has been completed as described above, the CPU 191 sends setting information required for accessing the Internet service provider A 17 to the camcorder 11 in step S79.

When the CPU 71 of the camcorder 11 receives the ISP-A setting information from the Internet service provider A 17 in step S58 of FIG. 9, the CPU 71 outputs it to the LCD 78 and displays thereon. With this operation, the user can confirm the ISP-A setting information. The ISP-A setting information includes, for example, a PPP log-in, a PPP password, the telephone number of an access point, a POP ID, a POP password, an e-mail address, a POP server, an SMTP server, and a news server, as shown in FIG. 11.

The user of the camcorder 11 writes down the contents shown in FIG. 11 in a memo pad, if necessary, and then, operates the input section 77 to output a confirmation signal to the Internet service provider A 17.

In step S80, the custom data base 52 of the Internet service provider A 17 sends camcorder setting information.

When the camcorder 11 receives the camcorder setting information in step S59 of FIG. 9, the camcorder 11 displays it on the LCD 78.

FIG. 12 shows example camcorder setting information sent from the customer data base 52 to the camcorder 11. In this example, the camcorder setting information includes a DI customer ID, a DI password, and the telephone number of an access point.

The telephone number of an access point indicates that of an access point where the camcorder 11 is connected to the Internet 10, specifically, that of the access point 51 in the Internet service provider A 17.

The user of the camcorder 11 operates the input section 77 to set the camcorder setting information displayed in this way in the camcorder 11 as a condition to connected to the Internet 10. The setting information is stored in the EEPROM 74.

In order that the user who bought a personal computer connects to the Internet 10 through a general service provider (in the case shown in FIG. 1, the Internet service provider B 18), for example, the user needs to specify 12 items, a PPP connection ID, a PPP connection password, the telephone number of an access point, a primary DNS server, a secondary DNS server, a proxy server, a port number, a POP authentication ID, a POP authentication password, a POP server, an SMTP server and an e-mail address, as shown in FIG. 13A. In contrast, the user who bought a camcorder 11 needs to specify just three items, a unified ID (corresponding to a DI customer ID shown in FIG. 12), a password (corresponding to a DI password shown in FIG. 12) and the telephone number of an access point (corresponding to the telephone number of an access point, shown in FIG. 12) as shown in FIG. 13B by performing the ISP-A easy registration process. Therefore, even user who is unfamiliar with setting operations can easily perform an Internet-connection operation.

When the user of the camcorder 11 has been a member of the Internet service provider A 17, the user operates the input section 77 to input the user ID for the Internet service provider A 17 in response to the request from the customer data base 52. In this case, when the CPU 71 of the camcorder 11 obtains the user ID for the Internet service provider A 17, input by the user in step S61 of FIG. 9, the CPU 71 sends the user ID for the Internet service provider A 17 to the customer data base 52 from the communication section 82.

When the CPU 191 of the customer data base 52 in the Internet service provider A 17 receives and obtains the user ID for the Internet service provider A 17, sent from the camcorder 11, in step S81 of FIG. 10, the CPU 191 sends camcorder setting information for associating the ISP-A user ID with the temporary ID and the temporary password included in the user personal information received by the process of step S71, to the camcorder 11 in step S82.

When the CPU 71 of the camcorder 11 receives the camcorder setting information for associating the ISP-A user ID with the temporary ID and the temporary password, from the customer data base 52 in step S62, the CPU 71 performs a setting process of associating the ISP-A user ID with the temporary ID and the temporary password according to an input obtained when the user operates the input section 77, in step S63. More specifically, the CPU 71 generates the correspondence table between the ISP-A user ID, and the temporary ID and the temporary password. Therefore, when a connection to the Internet is instructed with the temporary password and the temporary ID being input, the CPU 71 converts the temporary ID and the temporary password to the ISP-A user ID and performs an access process to the Internet service provider A 17.

After step S80 or S82 of FIG. 10, the process proceeds to step S83, and when information has been registered in the sub-processes executed so far or the user has updated registered information, the CPU 191 of the customer data base 52 sends the information to the camcorder 14.

When the customer data base 32 of the network system 14 receives the information from the Internet service provider A 17, the customer data base 32 registers it therein, and sends it also to the camcorder image station 41 of the network service business center 15 to register it therein.

Figure 14:
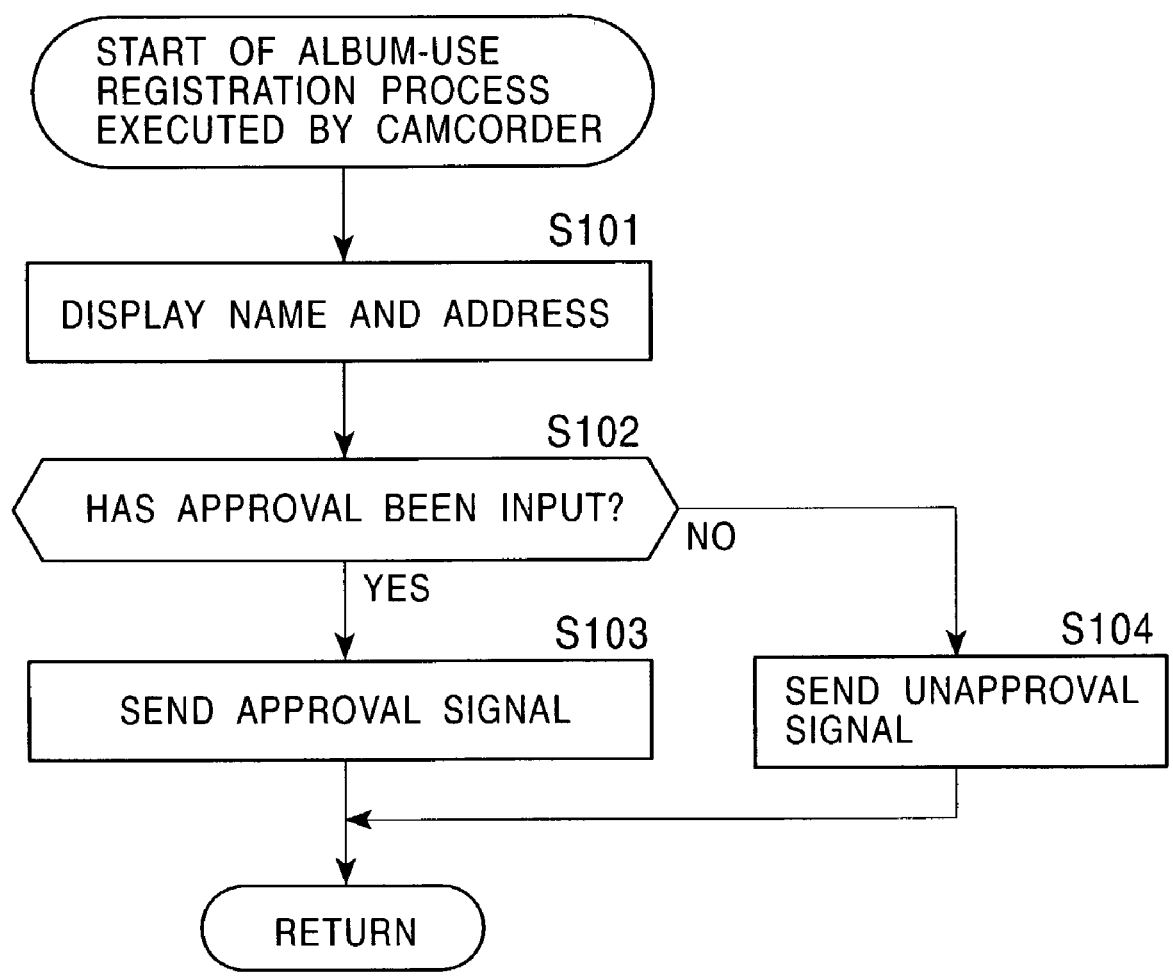
FIG. 14 is a flowchart of an album-use registration process executed by the camcorder shown in FIG. 1.

Following the ISP-A easy registration process, described above, the album-use registration process is executed. The album-use registration process will be further described by referring to flowcharts shown in FIG. 14 and FIG. 15. FIG. 14 is a flowchart of an album-use registration process executed by the camcorder 11, and FIG. 15 is a flowchart of an album-user registration process executed by the camcorder image station 41 corresponding to the process executed by the camcorder 11.

When the ISP-A easy registration process has been completed, the CPU 191 of the customer data base 52 in the Internet service provider A 17 transfers the management right of processing related to the camcorder 11 to the camcorder image station 41 of the network service business center 15.

Figure 15:
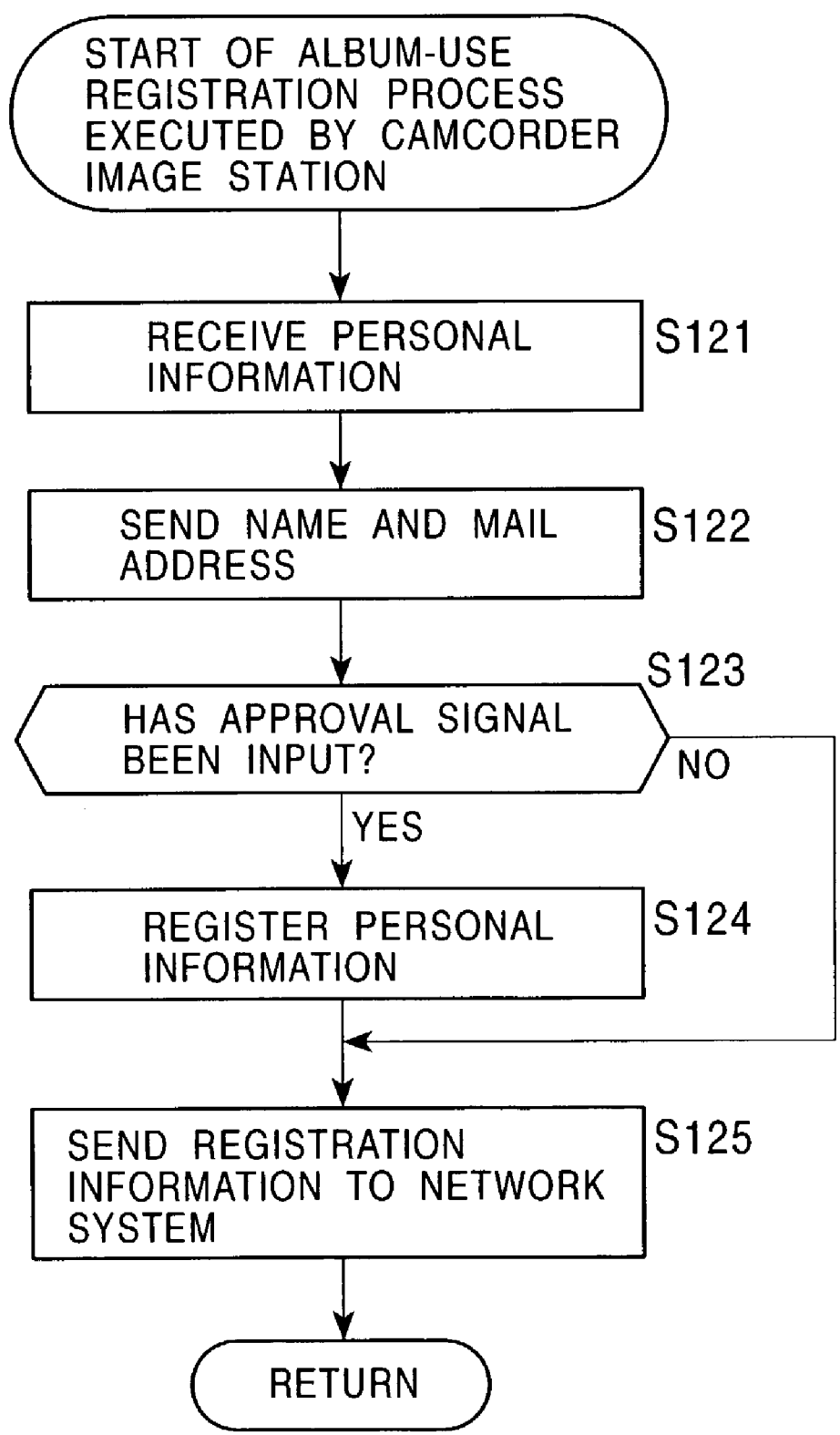
FIG. 15 is a flowchart of an album-use registration process executed by the camcorder image station shown in FIG. 1.

When the CPU 151 of the camcorder image station 41 receives through the communication section 159 the personal information related to the camcorder 11, sent by the customer data base 32 of the network system 14 in step S34 of FIG. 8, the CPU 151 sends it to the storage section 158 and stores therein in step S121 of FIG. 15. In step S122, the CPU 151 reads the name and the mail address from the received personal information, and sends them to the camcorder 11.

When the CPU 71 of the camcorder 11 receives the name and the mail address from the camcorder image station 41, the CPU 71 outputs them to the LCD 78 and displays them thereon in step S101. The user of the camcorder 11 looks at the indication, and determines whether the name and the mail address of the user are correct. The mail address (e-mail address) has been specified at membership registration (FIG. 11) to the Internet service provider A 17.

When the user of the camcorder 11 confirms that the name and the mail address are correct, if the user approves of the use of the name and the mail address for album-use registration, the user operates the input section 77 to input a message indicating the intention. In step S102, the CPU 71 determines whether an approval has been input. When an approval has been input, the process proceeds to step S103 and the CPU 71 sends an approval signal corresponding to the approval to the camcorder 41.

In contrast, if the user does not approve of the use for album-use registration, the user operates the input section 77 to input a message indicating the intention. In step S104, the CPU 71 sends an unapproval signal indicating that the user has not approved of the use for album-use registration to the camcorder image station 41.

The CPU 151 of the camcorder image station 41 determines in step S123 of the FIG. 15 whether the approval signal has been input. When the approval signal has been input, the process proceeds to step S124, and the CPU 151 stores the personal information received in step S121 in the storage section 158.

In contrast, when it is determined in step S123 that the approval signal has not been input, the process of step S124 is skipped.

As described above, the personal information corresponding to the temporary ID and the temporary password issued by the network system 14 is registered in the camcorder image station 41.

Then, in step S125, when the user has made an input to update the registered information, the CPU 151 of the camcorder image station 41 sends a message indicating the input to the network system 14.

The customer data base 32 of the network system 14 registers the update information in itself and sends it to the customer data base 52 of the Internet service provider 52 and registers therein.

When the customer data base 32 of the network system 14 has issued the temporary ID and the temporary password, the customer data base 32 sends a postcard describing a real ID and a real password to the user at the address of the user. When the user receives the postcard, the user changes the temporary ID and the temporary password to the real ID and the real password and uses them afterward.

When the customer data base 32 has issued the real ID and the real password, the customer data base 32 sends them to the network service business center 15 and to the Internet service provider A 17 through the Internet 10. The network service business center 15 and the Internet service provider A 17 register the real ID and the real password. The temporary ID and the temporary password can be used only for a predetermined period (for example, two weeks) after they are issued. The network system 14, the network service business center 15, and the Internet service provider A 17 sets the effective period of the temporary ID and the temporary password to two weeks, and, when the temporary ID and the temporary password are used after the effective period has elapsed, refuse an access.

In the foregoing description, user registration is performed from the camcorder 11 to the network system 14. Registration can be performed by a personal computer through the Internet or by a postcard.

Figure 16:
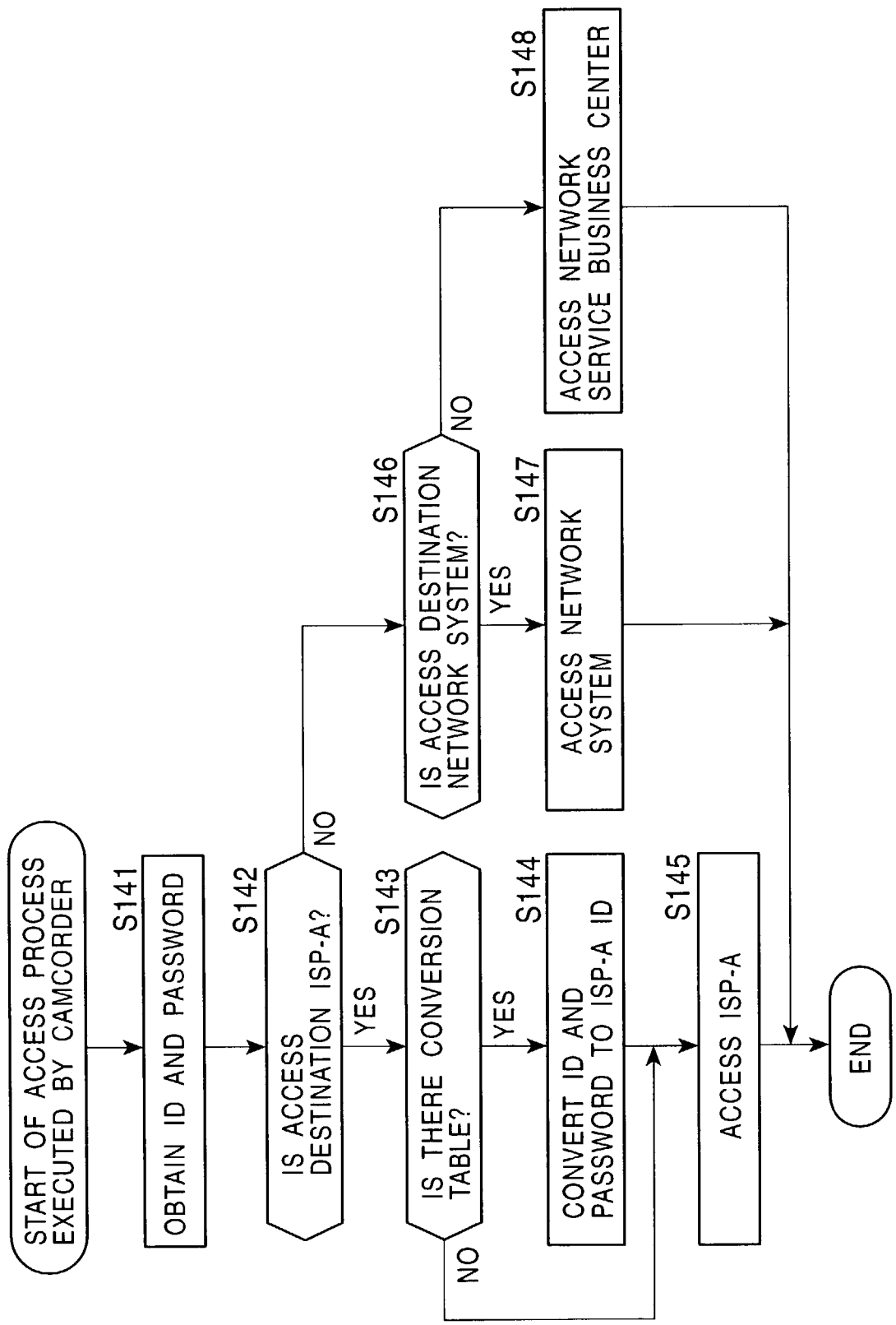
FIG. 16 is a flowchart of an access process executed by the camcorder shown in FIG. 1.

A process executed when the camcorder 11 is connected to the network system 14, the network service business center 15, or the Internet service provider A 17 will be described next by referring to a flowchart shown in FIG. 16. The user operates the input section 77 to input the temporary ID and the temporary password assigned at user registration to the network system 14 (or the real ID and the real password specified thereafter). In step S141, the CPU 71 obtains the ID and password input when the user operates the input section 77. In step S142, the CPU 71 determines whether the access destination specified by the user is the Internet service provider A 17.

When the access destination is the Internet service provider A 17, the process proceeds to step S134, and the CPU 71 determines whether the conversion table generated in step S63 of FIG. 9 exists. When the conversion table exists (when the user of the camcorder 11 has already been a member of the Internet service provider A 17 and has the user ID before user registration to the camcorder 11), the process proceeds to step S144, and the CPU 71 converts the ID and password obtained in step S141 to the user ID for the Internet service provider A 17 according to the conversion table. Then, in step S145, the CPU 71 controls the communication section 82 to access the Internet service provider A 17 by using the user ID.

When it is determined in step S143 that the conversion table does not exist (when the user buys the camcorder 11, performs user registration to the network system 14, and then, subscribes to the Internet service provider A 17), the process proceeds to step S145, and the CPU 71 executes a process of accessing the Internet service provider A 17 by using the input ID and password. In this case, as described above, since the customer data base 52 of the Internet service provider A 17 has the conversion table, the Internet service provider A 17 determines according to the conversion table whether the user of the camcorder 11 is a proper user.

When it is determined in step S142 that the access destination is not the Internet service provider A 17, the process proceeds to step S146, and the CPU 71 determines whether the access destination is the network system 14. When the access destination is the network system 14, the process proceeds to step S147, and the CPU 71 accesses the network system 14 by using the ID and password obtained in step S141. In the same way, when it is determined in step S146 that the access destination is not the network system 14 (when it is determined that the access destination is the network service business center 15), the process proceeds to step S148, and the CPU 71 accesses the network service business center 15 by using the ID and password obtained in step S141.

Figure 17:
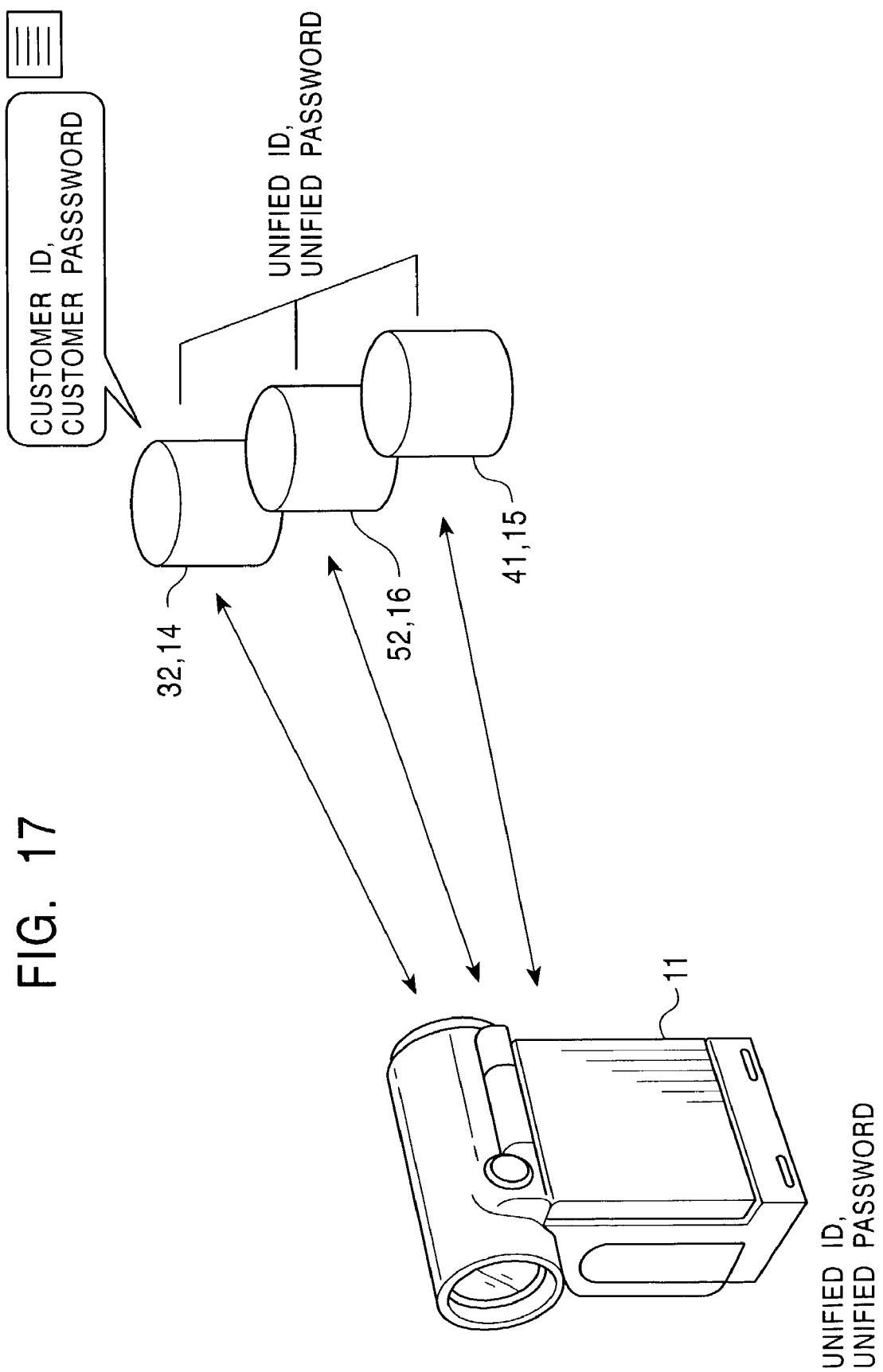
FIG. 17 is a view showing the use of a common ID and a common password.

As described above, in the service providing system, the temporary ID and the temporary password (unified ID and password) issued at user registration to the network system 14 are used as an ID and a password for the network system 14, the network service business center 15, and the Internet service provider A 17, as shown in FIG. 17, to be able to use the services of each facility.

An input assistance screen displayed on the LCD 78 and used when the user inputs data to the camcorder 11 will be described next.

FIG. 18, FIG. 19, FIG. 21, and FIG. 22 show an example input assistance screen for inputting Japanese.

Figure 18:
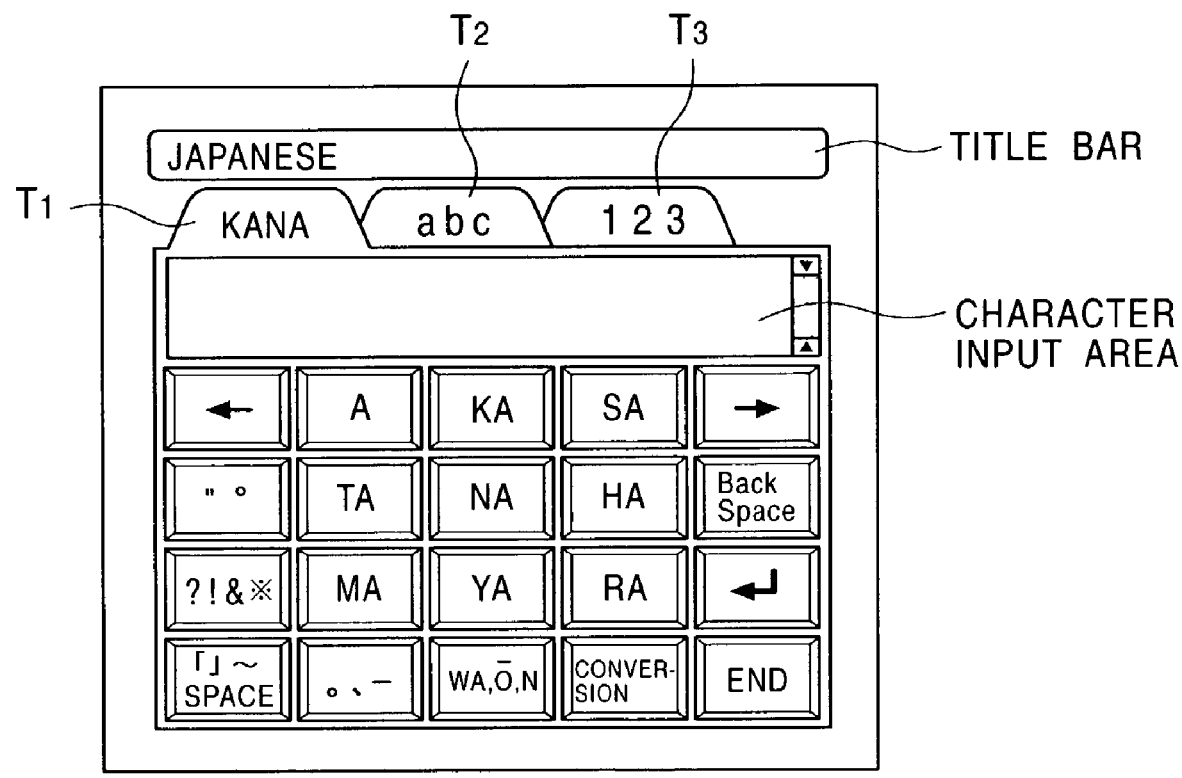
FIG. 18 is a view showing an example indication of an input assistance screen.

The input assistance screen for inputting Japanese is formed of a title bar and three tabs T1 to T3. FIG. 18 shows an example indication obtained when the tab T1 is selected. The input assistance screen shown in FIG. 18 is provided with a character input area, buttons (such as button on which "A" is displayed) for inputting hiragana, toggle buttons (such as a button on which "?!&*" is displayed) for inputting symbols, and others.

When a button for inputting hiragana, for example, a button (hereinafter called "A" button, and the other buttons are called in the same way) on which "A" is displayed is operated (touched), "A" is displayed in the character input area.

When a button for inputting symbols, for example, the "?!&*" button is repeatedly operated, "?", "!", "&", and "*" are displayed in that order in the character input area.

Figure 19:
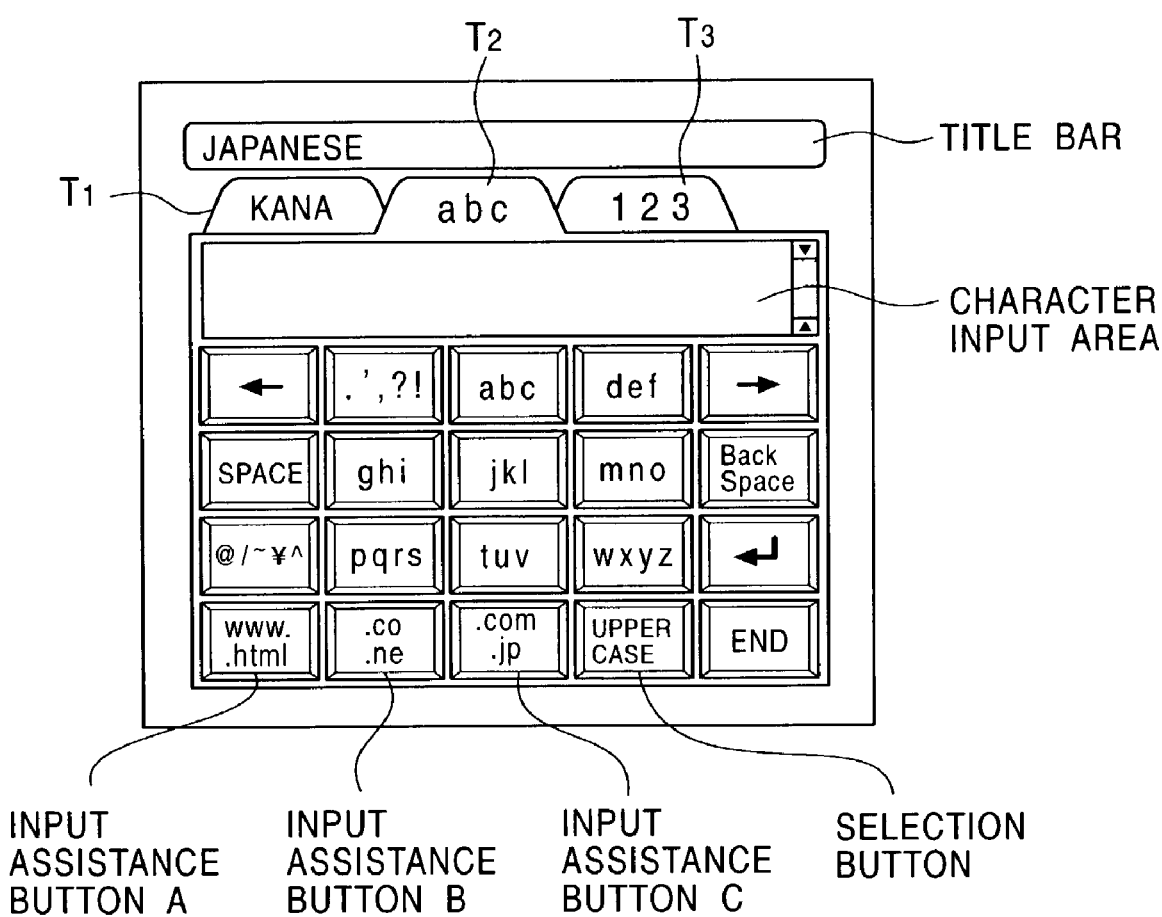
FIG. 19 is a view showing another example indication of the input assistance screen.

FIG. 19 shows an example indication obtained when the tab T2 is selected. The input assistance screen shown in FIG. 19 is provided with a character input area, toggle buttons (an "abc" button to a "wxyz" button) for inputting alphabetical letters, toggle buttons (such as a ".',?!" button) for inputting symbols, a button (selection button) operated to specify the upper-case or lower-case letters, toggle buttons (input assistance buttons A, B, and C) for inputting predetermined input assistance words, and others.

When a button for inputting alphabetical letters, such as the "abc" button, is repeatedly operated, "a", "b", and "c" are displayed in that order in the character input area.

When a button for inputting symbols, such as the ".',?!" button is repeatedly pressed, ".", "'", ",", "?", and "!" are displayed in that order in the character input area.

Figure 20A:
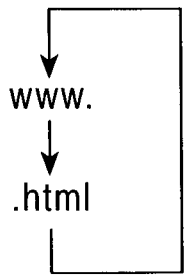
FIG. 20A, FIG. 20B, and FIG. 20C are views showing button operations for inputting input assistance words.

When the input assistance button A for inputting input assistance words is repeatedly operated, character strings "www." and ".html" serving as input assistance words in this case and shown in FIG. 20(A) are repeatedly displayed in an order indicated by arrows in FIG. 20(A) in the character input area.

Figure 20B:
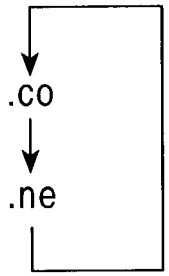

When the input assistance button B for inputting input assistance words is repeatedly operated, character strings ".co" and ".ne" serving as input assistance words in this case and shown in FIG. 20(B) are repeatedly displayed in an order indicated by arrows in FIG. 20(B) in the character input area.

Figure 20C:
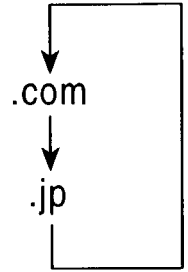

When the input assistance button C for inputting input assistance words is repeatedly operated, character strings ".com" and ".jp" serving as input assistance words in this case and shown in FIG. 20(C) are repeatedly displayed in an order indicated by arrows in FIG. 20(C) in the character input area.

Figure 21:
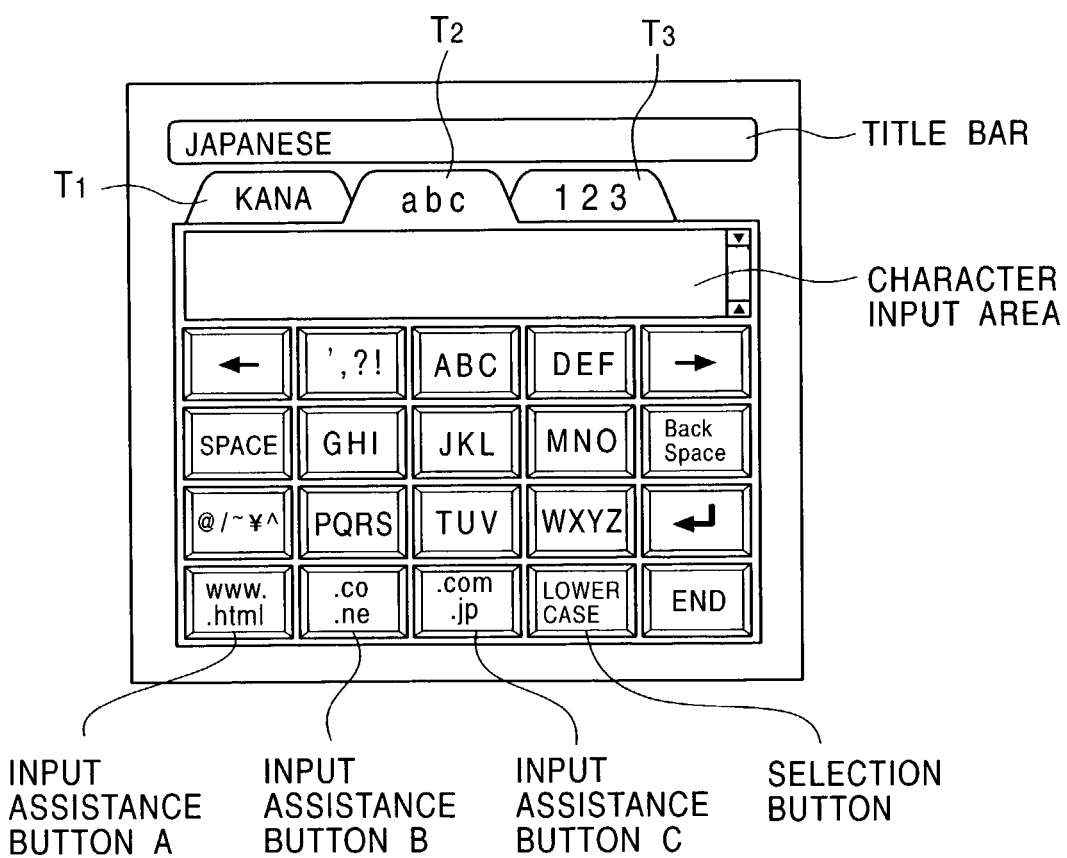
FIG. 21 is a view showing still another example indication of the input assistance screen.

When the selection button is operated in a state in which "UPPER CASE" is displayed as shown in FIG. 19, the indication is changed to "LOWER CASE" as shown in FIG. 21. Conversely, when the selection button is operated in a state in which "LOWER CASE" is displayed, the indication is changed to "UPPER CASE."

When "UPPER CASE" is displayed on the selection button, lower-case alphabetical letters can be input by operating toggle buttons for inputting alphabetical letters. When "LOWER CASE" is displayed on the selection button, upper-case alphabetical letters can be input by operating toggle buttons for inputting alphabetical letters.

When the tab T1 or the tab T3 is changed to the tab T2, "UPPER CASE" is displayed on the selection button as a default. In other words, lower-case letters can be input in this setting.

Figures 22, 23A, 23B:
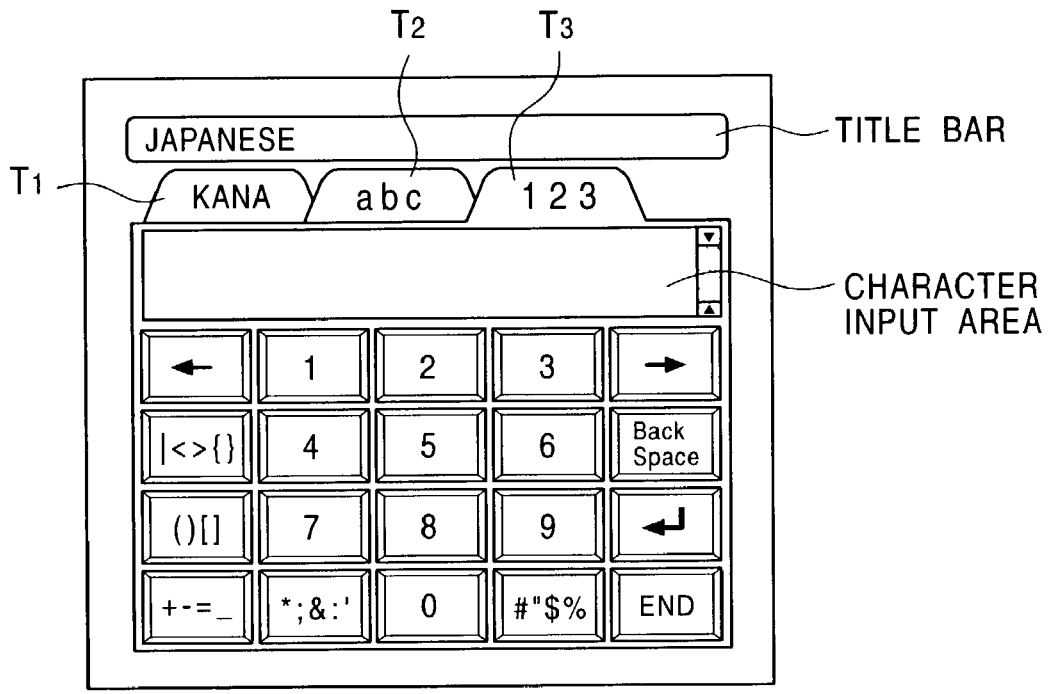
FIG. 22 is a view showing yet another example indication of the input assistance screen.
FIG. 23A and FIG. 23B are views showing information which can be input from the input assistance screen.

FIG. 22 shows an example indication obtained when the tab T3 is selected. The input assistance screen shown in FIG. 22 is provided with a character input area, toggle buttons (such as a "1" button) for inputting numerals, toggle buttons (such as a "( )[ ]" button) for inputting symbols, and others.

Since the input assistance screen for inputting Japanese, shown in FIG. 18, FIG. 19, FIG. 21, and FIG. 22, is provided with toggle buttons for inputting predetermined input assistance words, such as those shown in FIG. 23A, and for inputting predetermined symbols, such as those shown in FIG. 23B, the user can easily input assistance words or symbols into the camcorder 11 by operating the corresponding input assistance screen.

Figures 24, 25:
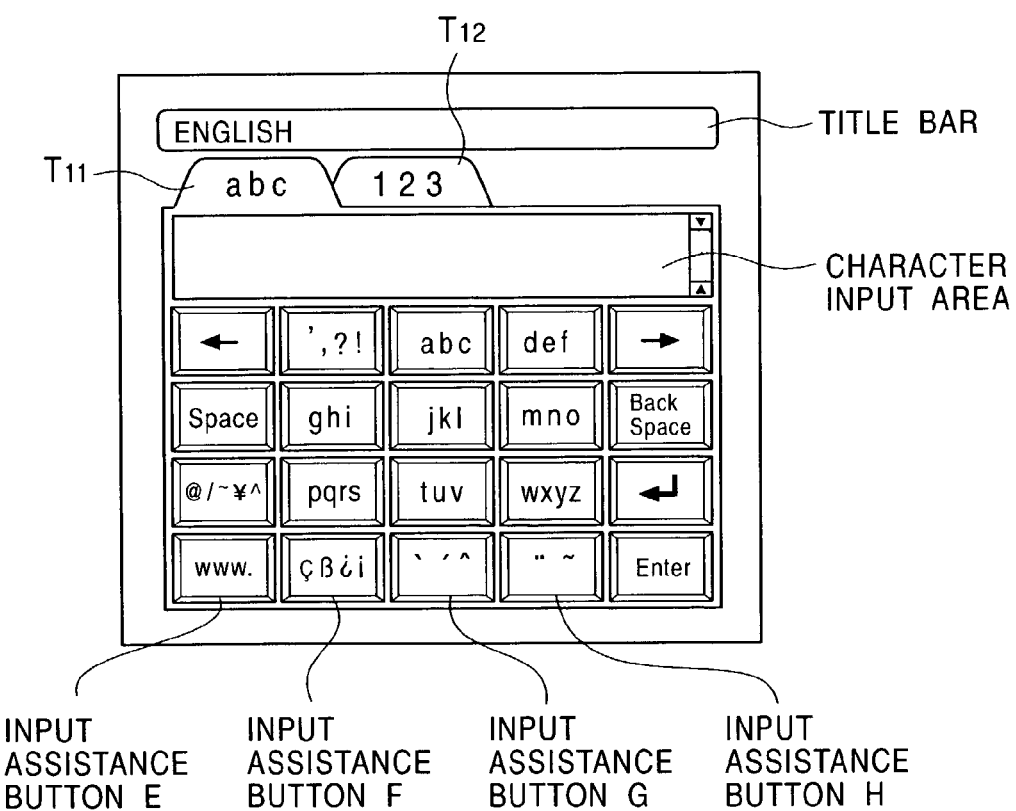
FIG. 24 is a view showing the types of information which can be input from the input assistance screen.
FIG. 25 is a view showing an example indication of another input assistance screen.

FIG. 24 is a table showing the types of characters which can be input by using the tab T1, the tab T2, and the tab T3 of the input assistance screen for inputting Japanese.

Figure 30:
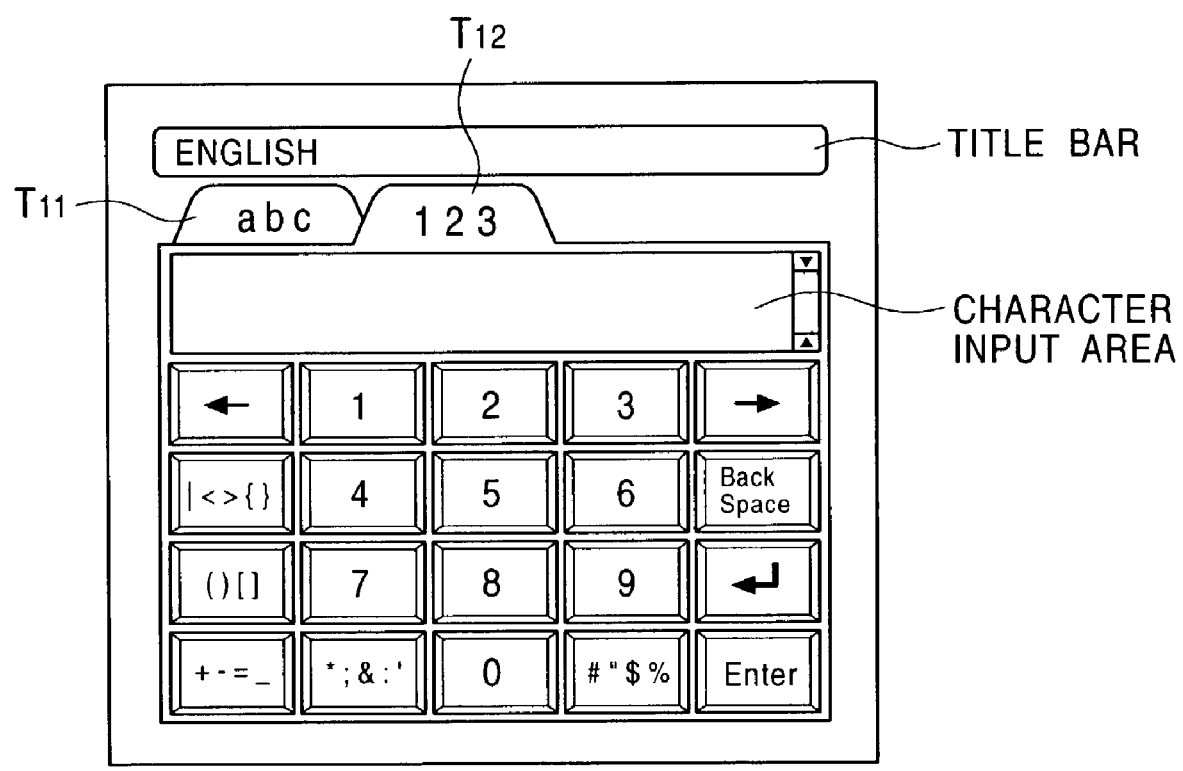
FIG. 30 is a view showing another example indication of the another input assistance screen.

FIG. 25 and FIG. 30 shows example indications of an input assistance screen for inputting English.

The input assistance screen for inputting English is formed of a title bar and two tabs T11 and T12. FIG. 25 shows an example indication obtained when the tab T11 is selected. The input assistance screen shown in FIG. 25 is provided with a character input area, toggle buttons for inputting alphabetical letters, toggle buttons for inputting symbols, toggle buttons (input assistance buttons E, F, G and H) for inputting predetermined input assistance words.

Figure 26:
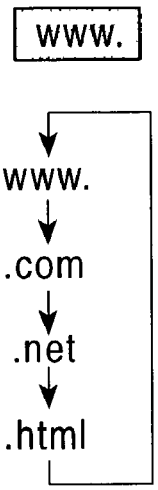
FIG. 26 is a view showing another-button operations for inputting input assistance words.

When the input assistance button E is repeatedly operated, character strings "www.", ".com", ".net", and ".html" serving as input assistance words in this case and shown in FIG. 26 are repeatedly displayed in an order indicated by arrows in FIG. 26 in the character input area.

Figure 27:
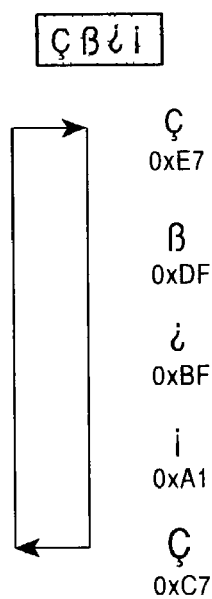
FIG. 27 is a view showing still-another-button operations for inputting input assistance words.

When the input assistance button F is repeatedly operated, character serving as input assistance words in this case and shown in FIG. 27 are repeatedly displayed in an order indicated by arrows in FIG. 27 in the character input area.

Figure 28:
FIG. 28 is a view showing yet-another-button operations for inputting input assistance words.

When the input assistance button G is repeatedly operated in a state in which "a", "A", "e", "E", "i", "I", "o", "O", "u", "U", "y", or "Y" is displayed in the character input area, characters serving as input assistance words in this case and shown in FIG. 28(A) to FIG. 28(L) are repeatedly displayed in the character input area in an order indicated by arrows in FIG. 28.

Figure 29:
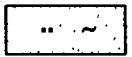
FIG. 29 is a view showing still-yet-another-button operations for inputting input assistance words.

When the input assistance button H is repeatedly operated in a state in which "a", "A", "e", "E", "i", "I", "o", "u", "U", "y", "Y", "n", or "N" is displayed in the character input area, characters serving as input assistance words in this case and shown in FIG. 29(A) to FIG. 29(N) are repeatedly displayed in the character input area in an order indicated by arrows in FIG. 29.

FIG. 30 shows an example indication of the input assistance screen for inputting English, obtained when the tab T12 is selected. The input assistance screen shown in FIG. 30 is provided with a character input area, toggle buttons for inputting numerals, toggle buttons for inputting symbols, and others.

Since the input assistance screen for inputting English shown in FIG. 25 and FIG. 30 is provided with toggle buttons for inputting alphabetical letters, and in addition, toggle buttons for inputting input assistance words such as those shown in FIG. 31A, input assistance words such as those shown in FIG. 31B, and symbols such as those shown in FIG. 31C, the user can easily input assistance words and others into the camcorder 11 by operating the input assistance screen.

FIG. 32 shows the numbers corresponding to characters which can be input through the input assistance screen for inputting English, determined by ISO 8859. In other words, in the present invention, these input assistance words can be input into the camcorder 11 without inputting the numbers shown in the figure. These numbers are indicated under the characters shown in FIG. 27, FIG. 28, and FIG. 29.

Characters enclosed by square frames in FIG. 32 can be displayed on the LCD 78 but cannot be input through the input assistance screen for inputting English, described above.

FIG. 33 is a table collectively indicating the types of characters which can be input by the tab T11 and the tab T12 on the input assistance screen for inputting English.

A character string shown in FIG. 34(A) and a symbol shown in FIG. 34(B), for example, can also be input by toggle buttons on the input assistance screen for inputting Japanese, and character strings shown in FIG. 35(A) and a symbol shown in FIG. 35(B), for example, can also be input by toggle buttons on the input assistance screen for inputting English.

The above-described series of processing can be executed not only by hardware but also by software. When the series of processing is executed by software, a program constituting the software is installed from a network or a recording medium into a computer which is built in special hardware, or into a machine, such as a general-purpose personal computer, which can execute various functions by installing various programs.

The recording medium is formed not only of a package medium, such as the magnetic disk 91, 131, 171, or 211 (including a floppy disk), the optical disk 92, 132, 172, or 212 (including a compact disk read only memory (CD ROM) and a digital versatile disk (DVD)), the magneto-optical disk 93, 133, 173, or 213 (including a Mini Disk (MD)), or the semiconductor memory 94, 134, 174, or 214, into which the program is recorded and which is distributed to provide the user with the program separately from the apparatus body, as shown in FIG. 2 to FIG. 5, but also of the ROM 72, 112, 152, or 192, or a hard disk included in the storage section 118, 158, or 198 which records the program, which has been embedded in advance in the apparatus body, and which is provided for the user.

In the present specification, steps describing the program recorded in a recording medium include not only processing to be executed in a time-sequential manner in a described order but processing which is not necessarily executed time-sequentially but is executed in parallel or independently.

In the present specification, a system refers to an entire apparatus formed of a plurality of units.

What is claimed is:

1. An information processing apparatus for processing information input according to an operation content on an operation screen, comprising:
   a first input section operated to input first information;
   first display control means for displaying information selected by the first input section on a display section;
   a second input section operated to input second information;
   second display control means repeatedly operated in a state in which the first information is being displayed on the display section, to repeatedly display a plurality of pieces of second information related to the first information in a predetermined order on the display section;
   input means for inputting said first information based on an input assistance button, the input assistance button is assigned to four character options; and input means for inputting said second information by operating a plurality of toggle buttons, each of the plurality of toggle buttons representing two or more predetermined character strings, which are related to each other in a particular field, wherein each of the two or more predetermined character strings includes a plurality of alphabetical letters, and wherein when each of the plurality of toggle buttons representing two or more character strings is repeatedly operated, the two or more character strings are repeatedly displayed in a predetermined sequence in a character input area.

2. An information processing apparatus according to claim 1, wherein the first information includes the alphabetical letters in English.

3. An information processing apparatus according to claim 2, wherein the second input section comprises an input section for selecting special characters other than the alphabetical letters in English.

4. An information processing apparatus according to claim 1, further comprising a camcorder having a communication function.

5. An information processing method for an information processing apparatus for processing information input according to an operation content on an operation screen, comprising:

a first display control step of displaying first information input by operating a first input section;

a second display control step of repeatedly operating a second input section in a state in which the first information is being displayed, to repeatedly display a plurality of pieces of second information related to the first information in a predetermined order;

an input step for inputting said first information based on an input assistance button, the input assistance button is assigned to four character options; and an input step for inputting said second information by operating a plurality of toggle buttons, each of the plurality of toggle buttons representing two or more predetermined character strings, which are related to each other in a particular field, wherein each of the two or more predetermined character strings includes a plurality of alphabetical letters, and wherein when each of the plurality of toggle buttons representing two or more character strings is repeatedly operated, the two or more character strings are repeatedly displayed in a predetermined sequence in a character input area.

6. An information processing method according to claim 5, wherein the first information includes the alphabetical letters, in English.

7. An information processing method according to claim 6, wherein the second input section comprises an input section for selecting special characters other than the alphabetical letters in English.

8. A recording medium storing a computer-readable program for an information processing apparatus for processing information input according to an operation content on an operation screen, the program comprising:

a first display control step of displaying first information input by operating a first input section;

a second display control step of repeatedly operating a second input section in a state in which the first information is being displayed, to repeatedly display a plurality of pieces of second information related to the first information in a predetermined order an input step for inputting said first information based on an input assistance button, the input assistance button is assigned to four character options; and an input step for inputting said second information by operating a plurality of toggle buttons, each of the plurality of toggle buttons representing two or more predetermined character strings, which are related to each other in a particular field, wherein each of the two or more predetermined character strings includes a plurality of alphabetical letters, and wherein when each of the plurality of toggle buttons representing two or more character strings is repeatedly operated, the two or more character strings are repeatedly displayed in a predetermined sequence in a character input area.

9. A program stored in a recording medium for an information processing apparatus for processing information input according to an operation content on an operation screen, the program making a computer execute:

a first display control step of displaying first information input by operating a first input section;

a second display control step of repeatedly operating a second input section in a state in which the first information is being displayed, to repeatedly display a plurality of pieces of second information related to the first information in a predetermined order an input step for inputting said first information based on an input assistance button, the input assistance button is assigned to four character options; and an input step for inputting said second information by operating a plurality of toggle buttons, each of the plurality of toggle buttons representing two or more predetermined character strings, which are related to each other in a particular field, wherein each of the two or more predetermined character strings includes a plurality of alphabetical letters, and wherein when the input assistance buttons when each of the plurality of toggle buttons representing two or more character strings is repeatedly operated, the two or more character strings are repeatedly displayed in a predetermined sequence in a character input area.

* * * * *